US012119125B2

(12) United States Patent
Morikawa et al.

(10) Patent No.: US 12,119,125 B2
(45) Date of Patent: Oct. 15, 2024

(54) NUCLEAR DISMANTLING APPARATUS AND METHOD

(71) Applicant: ATS Corporation, Cambridge (CA)

(72) Inventors: David Taro Morikawa, Cambridge (CA); Mark Johannesson, Cambridge (CA)

(73) Assignee: ATS Corporation, Cambridge (CA)

( * ) Notice: Subject to any disclaimer, the term of this patent is extended or adjusted under 35 U.S.C. 154(b) by 451 days.

(21) Appl. No.: 17/217,996

(22) Filed: Mar. 30, 2021

(65) Prior Publication Data

US 2021/0343436 A1    Nov. 4, 2021

Related U.S. Application Data

(60) Provisional application No. 63/002,920, filed on Mar. 31, 2020.

(51) Int. Cl.
| | | |
|---|---|---|
| *G21D 1/00* | (2006.01) | |
| *B25J 13/02* | (2006.01) | |
| *B25J 15/02* | (2006.01) | |
| *G06F 3/01* | (2006.01) | |
| *G21F 9/00* | (2006.01) | |
| *G21F 9/34* | (2006.01) | |

(52) U.S. Cl.
CPC ............ *G21D 1/003* (2013.01); *B25J 13/025* (2013.01); *B25J 15/0253* (2013.01); *G06F 3/016* (2013.01); *G21F 9/34* (2013.01); *G21F 9/002* (2013.01)

(58) Field of Classification Search
CPC ........... G21D 1/003; G21F 9/34; G21F 9/002; G06F 3/016; B25J 13/025; B25J 15/0253
See application file for complete search history.

(56) References Cited

U.S. PATENT DOCUMENTS

| | | | | |
|---|---|---|---|---|
| 11,571,723 B1 * | 2/2023 | Innes | ......................... | B02C 4/02 |
| 2015/0367507 A1 * | 12/2015 | Egawa | ..................... | B25J 9/041 |
| | | | | 901/17 |
| 2016/0336084 A1 * | 11/2016 | LaGuardia | ........... | B23D 59/006 |
| 2017/0316844 A1 * | 11/2017 | Riesenweber | ............ | G21F 7/06 |
| 2020/0269291 A1 * | 8/2020 | Crichlow | ................ | B09B 1/008 |
| 2021/0343442 A1 * | 11/2021 | Morikawa | ................. | G21F 9/34 |
| 2021/0350773 A1 * | 11/2021 | Furuya | ................. | G10H 1/0058 |

FOREIGN PATENT DOCUMENTS

| | | |
|---|---|---|
| FR | 2494163 A1 | 5/1982 |
| FR | 2954725 A1 | 7/2011 |
| WO | 2020002463 A1 | 1/2020 |

OTHER PUBLICATIONS

International Search Report and Written Opinion, Canadian Intellectual Property Office, Jul. 6, 2021.

* cited by examiner

*Primary Examiner* — Saul Rodriguez
*Assistant Examiner* — Ashley K Romano
(74) *Attorney, Agent, or Firm* — Valauskas Corder LLC

(57) ABSTRACT

A nuclear dismantling system for dismantling equipment contaminated with radioactive contamination, including a dismantling apparatus to be operated remotely while in a nuclear facility and a control system communicatively coupled to the dismantling apparatus to control the dismantling apparatus remotely.

12 Claims, 16 Drawing Sheets

NUCLEAR DISMANTLING APPARATUS AND METHOD

CROSS REFERENCE TO RELATED APPLICATIONS

This application claims the benefit of U.S. Provisional Patent Application No. 63/002,920, filed Mar. 31, 2020, the contents of which are hereby incorporated by reference.

FIELD

The disclosure relates to dismantling, particularly to an apparatus and method for dismantling nuclear equipment.

BACKGROUND

Equipment located in a hazardous environment may need to be dismantled. In some cases, manually dismantling risks endangering a worker by requiring the worker to work in the hazardous environment. In some cases, automated dismantling is difficult if the hazardous environment is a disordered environment.

Accordingly, improved dismantling apparatus and methods are needed.

SUMMARY

In a first aspect, some embodiments of the invention provide a nuclear dismantling system for dismantling equipment contaminated with radioactive contamination, comprising a dismantling apparatus to be operated remotely while in a nuclear facility, including a frame having a frame longitudinal axis, an elongated first arm mounted to the frame, the elongated first arm extending along a first arm longitudinal axis and having a first arm forward end to reach a workpiece, a first gripper mounted to the first arm to grip a workpiece, and a first cutter mounted to the first arm to cut the workpiece free from an environmental feature, and wherein the elongated first arm is moveable between a retracted position to facilitate movement of the dismantling apparatus and an extended position having the first arm forward end extending an extended distance from the frame to reach the workpiece, and wherein when the elongated first arm is in the extended position the gripper is operable to grab a workpiece adjacent the first arm forward end and the cutter is operable to cut the workpiece adjacent the gripper; and a control system communicatively coupled to the dismantling apparatus to control the dismantling apparatus remotely.

In some examples, the control system is a haptic control system and is communicatively coupled to the dismantling apparatus to receive a set of haptic feedback from the dismantling apparatus.

In some examples, the gripper is configured to grip the workpiece securely and apply sufficient pressure to the workpiece to reduce cutting-related vibration.

In some examples, the extended position is further from the frame than the retracted position.

In some examples, the dismantling apparatus is a stationary apparatus to be positioned adjacent a workpiece.

In some examples, the elongated first arm is rotatably mounted to the frame to rotate about the first arm longitudinal axis.

In some examples, the elongated first arm is mounted to a first arm mount of the frame with the first arm longitudinal axis parallel to a first mount longitudinal axis, the first arm mount pivotable about a first mount transverse axis relative a base of the frame.

In some examples, the elongated first arm is mounted to a first arm mount of the frame with the first arm longitudinal axis parallel to a first mount longitudinal axis, the first arm mount movable between a first mount forward position in which the elongated first arm extends out from the frame forward end and a first mount lateral position in which the elongated first arm extends out from a frame lateral side.

In some examples, the first arm mount includes a pillar member extending along a vertical pillar axis, the pillar member rotatable about the vertical pillar axis to move the elongated first arm between the forward position and the lateral position.

In some examples, the frame includes a base and at least one linearly moveable carriage, each linearly moveable carriage moveable relative to the base along a linear carriage track, the elongated first arm mounted to the at least one linearly movable carriage.

In some examples, the at least one linearly moveable carriage includes a first carriage movable along a first linear track on the base; and a second carriage movable along a second linear track on the first carriage, the second linear track perpendicular to the first linear track and the elongated first arm mounted to the second carriage.

In some examples, the base is a stationary skid to be positioned adjacent the workpiece.

In some examples, the dismantling apparatus includes a contamination containment system, the contamination containment system including at least one of a vacuum and a foam nozzle.

In some examples, the dismantling apparatus further includes an elongated supporting arm, the elongated supporting arm extending along a supporting arm longitudinal axis and having a supporting arm forward end and a supporting arm rearward end opposite the supporting arm forward end, the elongated supporting arm including a supporting cutter mounted to the supporting arm forward end, the supporting arm moveable independently from the first arm.

In some examples, the supporting arm is mounted to the frame adjacent the first arm to assist in cutting a workpiece gripped by the first arm free from an environmental feature.

In some examples, the cutter includes at least one of a mechanical cutting tool and a thermal cutter.

In some examples, the first gripper includes a mechanical gripper, and the mechanical gripper includes at least one of a gripping jaw and a penetrating screw.

In a second aspect, some embodiments of the invention provide a nuclear dismantling apparatus to be controlled remotely by a communicatively coupled haptic control system, comprising a frame having a frame longitudinal axis; an elongated first arm mounted to the frame, the elongated first arm extending along a first arm longitudinal axis and having a first arm forward end to reach a workpiece; a first gripper mounted to the first arm to grip a tubular workpiece from a radial side of the tubular workpiece; and a first cutter mounted to the first arm to cut the tubular workpiece free from an environmental feature while the first gripper holds the tubular workpiece from the side of the tubular workpiece, and wherein the elongated first arm is configured to move between a retracted position to facilitate movement of the dismantling apparatus and an extended position having the first arm forward end extending an extended distance from the frame to reach the workpiece, and wherein when the elongated first arm is in the extended position the gripper is operable to grab the tubular workpiece adjacent the first arm forward end and the cutter is operable to cut the workpiece adjacent the gripper.

In some examples, the dismantling apparatus is a stationary apparatus to be positioned adjacent a workpiece.

In some examples, the frame includes a stationary base and at least one linearly moveable carriage mounted to the base, each linearly moveable carriage moveable relative to the base along a linear carriage track, the elongated first arm mounted to the at least one linearly movable carriage.

In a third aspect, some embodiments of the invention provide a method of dismantling in a hazardous environment, comprising providing a dismantling apparatus in the hazardous environment, the dismantling apparatus including a first gripper and a first cutter; communicatively coupling a haptic control system to the dismantling apparatus to control the dismantling apparatus and receive haptic feedback from the dismantling apparatus; operating the haptic control system while in a haptic feedback mode to move the first gripper to a workpiece and secure a first gripper hold on the workpiece; operating the haptic control system, while maintaining the first gripper hold on the workpiece, to use the first cutter to cut the workpiece free from an environmental feature; operating the haptic control system, while maintaining the first gripper hold on the workpiece, to move the first gripper to a disposal location; and operating the haptic control system to release the first gripper hold on the workpiece.

In some examples, the hazardous environment is in a nuclear power facility.

In some examples, the first gripper is mounted to a first arm forward end of an elongated first arm of the dismantling apparatus, and the first cutter is mounted to the first arm forward end adjacent the first gripper.

In a fourth aspect, some embodiments of the invention provide a nuclear dismantling system for dismantling equipment contaminated with radioactive contamination, comprising a dismantling apparatus to be operated remotely while in a nuclear facility, including a frame having a frame vertical axis, a mast member mounted to the frame, the mast member extending along a mast vertical axis and having a mast lower end to enter an underlying chamber; and a work arm mounted to the mast member and bearing a gripper, and wherein the mast member is moveable between a retracted position to facilitate dispensing the workpiece and an extended position having the mast lower end extending an extended distance below a frame bottom side to reach the workpiece, and wherein when the mast member is in the extended position the gripper is operable to grab a workpiece adjacent the mast lower end, and a control system communicatively coupled to the dismantling apparatus to control the dismantling apparatus remotely.

In some examples, the control system is a haptic control system and is communicatively coupled to the dismantling apparatus to receive a set of haptic feedback from the dismantling apparatus.

In some examples, the mast member is mounted to the frame with the mast vertical axis parallel with the frame vertical axis.

In some examples, the dismantling system further comprises a winch actuator to move the mast member between the retracted position and the extended position.

In some examples, the mast member is a telescoping mast member including a barrel and at least one stage.

In some examples, the at least one stage includes a bottom stage, the barrel is at a mast upper end and the bottom stage is at the mast lower end, and the winch actuator is secured to the frame and to the bottom stage to raise and lower the bottom stage relative to the frame.

In some examples, the work arm is pivotally mounted to the mast lower end.

In some examples, the frame includes a base and at least one linearly moveable carriage, each linearly moveable carriage moveable relative to the base along a linear carriage track, the mast member mounted to the at least one linearly movable carriage.

In some examples, the at least one linearly moveable carriage includes a first carriage movable along a first linear track on the base; and a second carriage movable along a second linear track on the first carriage, the second linear track perpendicular to the first linear track and the mast member mounted to the second carriage.

In some examples, the dismantling apparatus is a stationary apparatus to be positioned adjacent a workpiece.

In some examples, the dismantling apparatus further comprises a transfer tray mounted to the frame adjacent the mast lower end when the mast lower end is in the retracted position to receive a workpiece from the work arm; and a disposal system mounted to the frame adjacent the transfer tray, the disposal system including a movable disposal arm to retrieve the workpiece from the transfer tray and carry the workpiece to a disposal location.

In some examples, the disposal system includes a gantry support, the disposal arm mounted to the gantry support.

In a fifth aspect, some embodiments of the invention provide a dismantling apparatus to be controlled remotely by a communicatively coupled haptic control system, including a frame having a frame vertical axis extending between a frame upper end and a frame lower end opposite the frame upper end; a telescoping mast member mounted to the frame and having a mast vertical axis extending between a mast upper end and a mast lower end opposite the mast upper end, the telescoping mast member including a barrel at the mast upper end and at least one stage, the at least one stage including a bottom stage at the mast lower end; a winch actuator coupled to the mast member to move the mast member between a retracted position having the mast lower end a retracted distance from a frame bottom side and an extended position having the mast lower end extending an extended distance below the frame bottom side, the extended position below the retracted position, the winch actuator coupled to the frame and the bottom stage to raise and lower the bottom stage relative to the frame; and an work arm having an arm proximate end and an arm distal end opposite the arm proximate end, the work arm mounted at the arm proximate end to the mast lower end, the work arm having an end effector coupling at the arm distal end to receive an end effector.

In some examples, the frame includes a base and at least one linearly moveable carriage, each linearly moveable carriage moveable relative to the base along a linear carriage track, the telescoping mast member mounted to the at least one linearly movable carriage.

In some examples, the end effector includes at least one of a gripper and a cutter.

In some examples, the work arm is pivotally mounted to the mast lower end.

In a sixth aspect, some embodiments of the invention provide a method of dismantling in a hazardous environment, comprising mounting a frame of a dismantling apparatus to an environmental surface in the hazardous environment above a workpiece, the dismantling apparatus including mast member mounted to the frame and extendable below the frame; providing a haptic control system at a remote location remote from the hazardous environment; communicatively coupling the haptic control system in the remote location to the dismantling apparatus in the hazardous environment to control the dismantling apparatus and receive haptic feedback from the dismantling apparatus; operating the haptic control system in the remote location in a haptic feedback mode to lower the mast member below the frame and position a cutter secured to a lower end of the mast member adjacent the workpiece; and operating the haptic control system in the remote location while the cutter is adjacent the workpiece to apply the cutter to the workpiece to cut the workpiece free from an environmental feature.

In some examples, the hazardous environment is in a nuclear power facility.

In some examples, the method further comprises operating the haptic control system in the remote location to apply a gripper secured to the lower end of the mast member to the workpiece to secure a gripper hold on the workpiece; operating the haptic control system in the remote location, after the workpiece is cut free from the environmental feature and while maintaining the gripper hold, to withdraw the mast member to a retracted position wherein the gripper is above a tray; and operating the haptic control system in the remote location to release the gripper hold when the gripper is above the tray to deposit the workpiece into the tray.

In some examples, the mast member is a telescoping mast member.

BRIEF DESCRIPTION OF THE DRAWINGS

The drawings included herewith are for illustrating various examples of systems, methods, and apparatus of the present specification. In the drawings.

DETAILED DESCRIPTION

Various apparatus or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
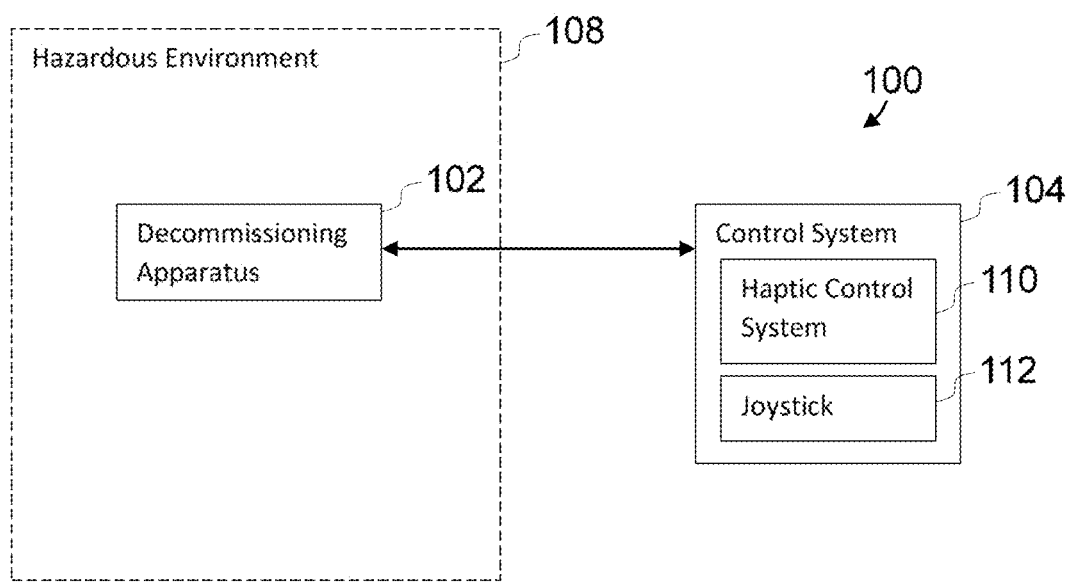
FIG. 1 is a schematic diagram of a dismantling system.

Referring to FIG. 1, a dismantling apparatus 102 is shown. The dismantling apparatus 102 may be provided alone in some examples. In some examples, the dismantling apparatus 102 is to be used in a disordered environment. In some examples, it is difficult to fully automate operations of the dismantling apparatus 102 in a disordered environment. In some examples, the dismantling apparatus 102 is communicatively coupled to a control system. In the illustrated example, the dismantling apparatus 102 is part of a dismantling system 100. The dismantling system 100 also includes a control system 104 communicatively coupled to the dismantling apparatus to control the dismantling apparatus remotely.

In some examples, the processes of the dismantling apparatus 102 are manually controlled by a user using the control system 104. In some examples, some processes of the dismantling apparatus 102 are automated or semi-automated while others are manually controlled by a user using the control system 104. For example, a user may be able to switch between manual and automated control and/or authorize or instigate one or more preprogrammed moves of the dismantling apparatus 102. In some examples, processes of the dismantling apparatus 102 in a ordered and/or known space can be automated and processes of the dismantling apparatus 102 in a disordered and/or unknown space can be manual. In some examples, the control system 104 includes at least one data storage device storing instructions for one or more preprogrammed moves and at least one processor to access and implement the instructions.

In some examples, the control system 104 is communicatively coupled to the dismantling apparatus 102 wirelessly. In some examples, the control system 104 is communicatively coupled to the dismantling apparatus 102 by one or more wired connections. In the illustrated example, the control system 104 is communicatively coupled to the dismantling apparatus 102 through a wireless network 106.

In some examples, the dismantling apparatus 102 is to be operated remotely because the dismantling apparatus 102 is to operate in an unsafe environment and the control system 104 is outside the unsafe environment. In the illustrated example, the dismantling apparatus 102 is in a hazardous environment 108 and the control system 104 is outside the hazardous environment 108. In some examples, the hazardous environment 108 includes one or more contaminants that is detrimental to human health and can cause injury and/or death, and so the control system 104 is outside the hazardous environment 108 to allow a user to operate the dismantling apparatus 102 from outside the hazardous environment 108 by using the control system 104.

In some examples, the hazardous environment 108 contains radioactive contaminants. In some examples, the hazardous environment 108 is inside a nuclear facility, such as a nuclear power plant. In some examples, the hazardous environment 108 is an area in a nuclear power plant containing radioactive contaminants.

In some examples, operating the dismantling apparatus 102 remotely protects a user from some or all exposure to the hazardous environment 108. For example, operating the dismantling apparatus 102 using the control system 104 as illustrated in FIG. 1 may result in a reduced exposure of a user to the hazardous environment 108.

In some examples, such as the example illustrated in FIG. 1, the control system 104 includes a haptic control system 110 communicatively coupled to the dismantling apparatus 102 to receive a set of haptic feedback from the dismantling apparatus 102. An example of a haptic control system is the Quanser HD²™ haptic input device with force feedback, which can incorporate 6 degrees-of-freedom haptics. Haptic controls may provide a user with more intuitive control over the dismantling apparatus 102. In some examples, the haptic control system 110 facilitates one or more manual operations of the dismantling apparatus 102.

In some examples, the control system 104 includes a non-haptic manual control system in addition or in alternative to the haptic control system 110. In the illustrated example, control system 104 includes a joystick 112 in a non-haptic manual control system. In some examples, the joystick 112 is provided for use in controlling one or more course positioning move of the dismantling apparatus 102.

In some examples, one or both of the dismantling apparatus 102 and the control system 104 is programmed to limit movement of the dismantling apparatus 102 beyond a predetermined movement boundary. Instructions for respecting the movement boundary may be stored in a data storage device communicatively coupled to one or both of the dismantling apparatus 102 and the control system 104 to be executed by a processor communicatively coupled to one or both of the dismantling apparatus 102 and the control system 104. A movement boundary and/or a mapping system may be employed to prevent the dismantling apparatus 102 from damage due to hitting other objects or itself. Where the dismantling apparatus 102 includes two or more moveable members, the movement boundary may prevent the moveable members from hitting one another.

Figure 2:
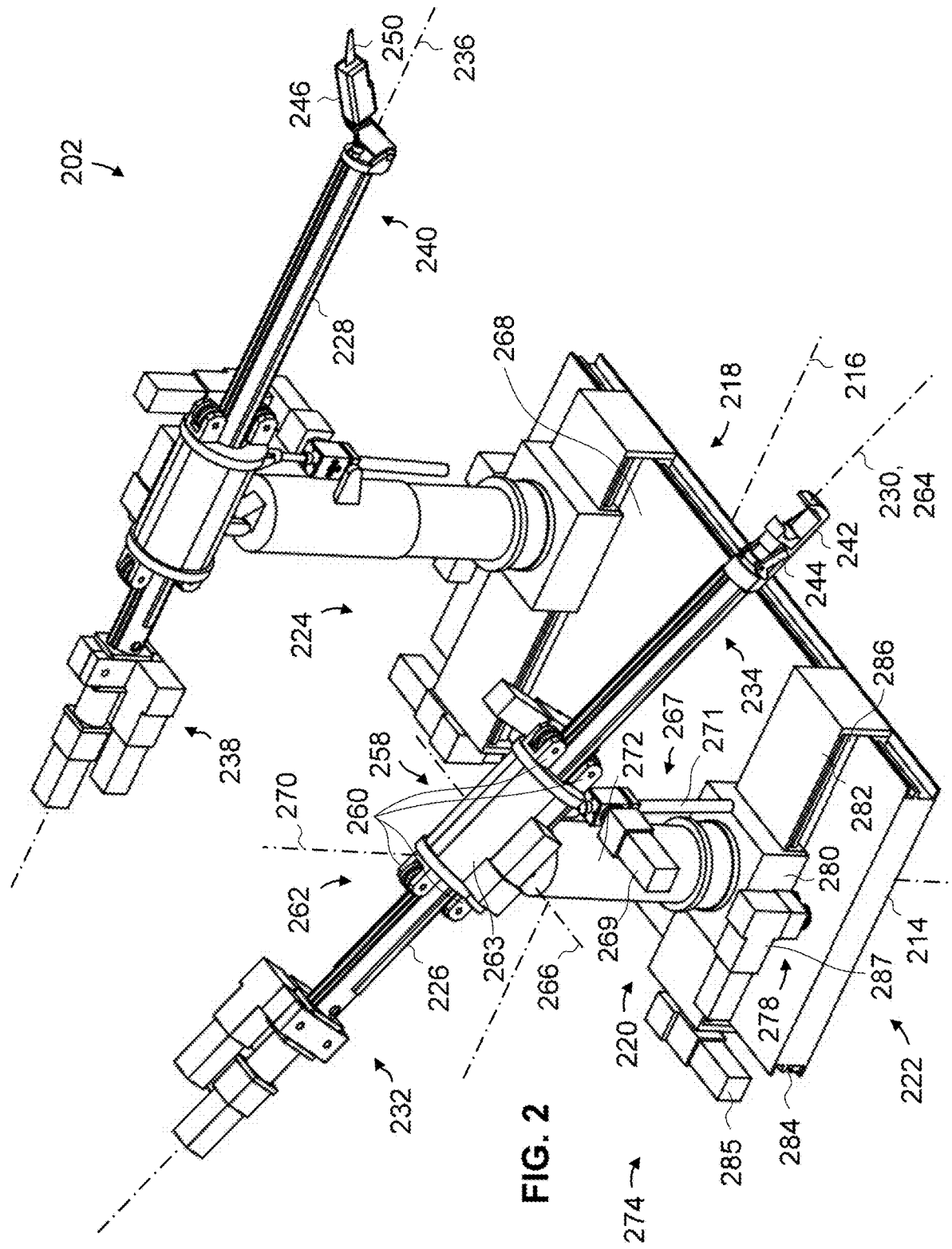
FIG. 2 is a perspective view of a first dismantling arm apparatus.

Referring now to FIG. 2, illustrated is an example of a dismantling arm apparatus 202. The dismantling arm apparatus 202 is similar in many respects to the dismantling apparatus 102, and like features are identified by like reference numbers incremented by 100. In some examples, the dismantling arm apparatus 202 is for use in a refurbishment operation. In some examples, the dismantling arm apparatus 202 is used to dismantle equipment that is to be replaced in a refurbishment operation.

The exemplary dismantling arm apparatus 202 includes a frame 214 and at least one elongated arm. The frame 214 has a frame longitudinal axis 216, a frame forward end 218, a frame rearward end 220, a first frame lateral side 222, and a second frame lateral side 224.

In some examples, the dismantling arm apparatus 202 includes a single elongated arm. A single elongated arm may simplify the dismantling apparatus 202 and prevent arms from interfering with one another. In some examples, the dismantling arm apparatus 202 includes two or more elongated arms. Two or more elongated arms may cooperate to more easily operate on a workpiece.

In the illustrated example, dismantling arm apparatus 202 includes an elongated first arm 226 and an elongated second arm 228, each mounted to the frame 214. The elongated first arm 226 has a first arm longitudinal axis 230 extending between first arm rearward end 232 and first arm forward end 234. The elongated second arm 228 has a second arm longitudinal axis 236 extending between second arm rearward end 238 and second arm forward end 240.

In some examples, one or more end effector can be mounted on each arm of the dismantling arm apparatus 202. In the illustrated example, a first gripper 242 and a first cutter 244 (see also FIG. 3) are mounted to elongated first arm 226, and a second cutter 246 is mounted to elongated second arm 228. In some examples, having the first gripper 242 and the first cutter 244 mounted to elongated first arm 226 allows the first gripper 242 and the first cutter 244 to operate adjacent one another. In some examples, adjacent operation allows the first gripper 242 to reduce vibration caused by first cutter 244. In some examples, adjacent operation facilitates moving both the first gripper 242 and first cutter 244 through the same operational opening in an environmental feature to access an obstructed workpiece. In some examples, adjacent operation facilitates identifying a workpiece gripped by the first gripper 242 to which the first cutter 244 is to be applied.

Figure 3:
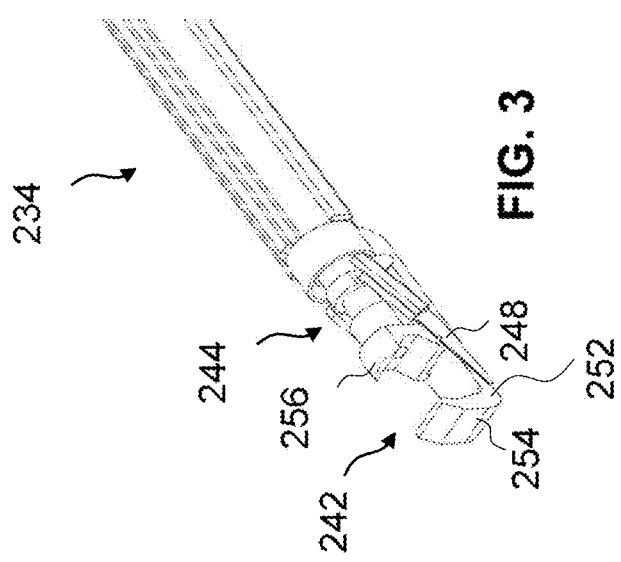
FIG. 3 is an expanded view of a first portion of the dismantling arm apparatus of FIG. 2.

Referring now to FIG. 3, in some examples the first cutter 242 and/or the second cutter 242 may include a mechanical cutting tool. In the illustrated example, first cutter 242 includes a cutting blade 248 as a mechanical cutting tool. The second cutter 246 also includes a cutting blade 250 (FIG. 1). In some examples, the first cutter 242 and/or the second cutter 242 may include one or more other cutters in addition to or in alternative to a blade, such as a thermal cutting tool and a different mechanical cutting tool.

In some examples, the first gripper 242 includes at least one of a mechanical gripper and a magnetic gripper. Examples of mechanical grippers include gripping jaws and penetrating screws. In the illustrated example, the first gripper 242 includes a gripping jaw 252 as a mechanical gripper. The gripping jaw 252 includes a stationary first jaw member 254 and a movable second jaw member 256. In some examples, the gripping jaw 252 can apply enough force to deform a metal tube so as to secure a firm grip on the metal tube. In some examples, the gripping jaw 252 is closed in an automated closing operation in which the movable second jaw member 256 is advanced towards the stationary first jaw member 254 to grip a workpiece received therebetween. In some examples, the automated closing operation applies at least a 1,000 lb clamp force. In some examples, the automated closing operation applies about a 5,000 lb clamp force.

Referring again to FIG. 2, in some examples at least one arm is moveable between a retracted position and an extended position. The retracted position facilitates movement of the dismantling arm apparatus 202 while the extended position allows the end effector or end effectors to be positioned adjacent a workpiece to operate on the workpiece. For example, where the end effectors include a gripper and a cutter, in some examples when an arm is in the extended position the gripper is operable to grab a workpiece adjacent the first arm forward end and the cutter is operable to cut the workpiece adjacent the gripper. In some examples, the extended position is further from the frame than the retracted position.

In some examples, at least one of arm roll, arm pitch, arm yaw, arm longitudinal position, arm vertical position, and arm lateral position of at least one arm can be adjusted. In some examples, at least arm pitch, arm yaw, and arm longitudinal positon of at least one arm can be adjusted.

In the illustrated example, the elongated first arm 226 is moveable along the first arm longitudinal axis 230. A first longitudinal motion actuator 258 is coupled to the elongated first arm to drive the elongated first arm 226 forwards and rearwards along the first arm longitudinal axis 230.

In some examples, an actuator is a simple, durable actuator. In some examples, an actuator includes a servo motor. In some examples, an actuator includes a servo motor and a toothed wheel for cooperating with a toothed track. In the illustrated example, the first longitudinal motion actuator 258 includes a set of servo motors mounted on the frame 214 with toothed wheels 260 to engage toothed tracks on the elongated first arm 226.

In the illustrated example, the elongated first arm 226 is rotatably mounted to frame 214 to facilitate adjusting arm roll. The elongated first arm 226 is mounted to a first arm mount 262. The illustrated example first arm mount 262 includes an annular pivotable member 263 extending along a first arm mount longitudinal axis 264 coaxial with the elongated first arm longitudinal axis 230. The elongated first arm 226 is received within the annular member and rotatable about the first arm longitudinal axis 230 within the annular member. In some examples, toothed wheels 260 are mounted to a drum which rotates inside the housing 263 to roll the elongated first arm 226.

In the illustrated example, the first arm mount 262 is pivotable about a first mount transverse axis 266 (see also FIG. 5) relative to a base 268 of the frame 214 to facilitate adjusting arm pitch. A first driving link 267 joins the annular pivotable member 263 to a pillar member 272. The first driving link 267 includes a pivot actuator 269 to extend or retract an upper link member 271 to raise or lower the annular pivotable member 263. In some examples, the pillar member 272 is operable to extend and retract vertically. In some examples, the pillar member 272 is operable to extend and retract vertically and includes a vertical drive actuator to facilitate vertical movement.

The illustrated first arm mount 262 is also rotatable about an arm mount vertical axis 270 to facilitate arm yaw. In the illustrated example, the annular pivotable member 263 is pivotally secured to the pillar member 272 by a pin assembly. The pillar member 272 extends along the arm mount vertical axis 270, and is rotatably mounted to a lower portion 274 of the frame. A yaw motion actuator is coupled to the pillar member 272 to drive the pillar member 272 rotationally about the arm mount vertical axis 270.

The illustrated first arm mount 262 is movable between a first mount forward position in which the elongated first arm 226 extends out from the frame forward end 218 and a first mount lateral position in which the elongated first arm 226 extends out from the first frame lateral side 222. In the first mount forward position of the illustrated first arm mount 262 a projection of the first arm mount longitudinal axis 264 extends out from the frame forward end 218. In the first mount lateral position of the illustrated first arm mount 262 a projection of the first arm mount longitudinal axis 264 extends out from the first frame lateral side 222.

In the illustrated example, arm longitudinal position and arm lateral position of the elongated first arm 226 are also adjustable by adjusting the frame 214. In addition to movement along the first arm longitudinal axis 230 driven by the first longitudinal motion actuator 258, the position of the elongated first arm 226 may also be adjusted by adjusting the frame 214. In some examples, an arm and/or arm mount may be mounted to or include a carriage assembly including at least one moveable carriage. In some examples, a moveable carriage is a linearly moveable carriage moveable along a linear carriage track. In some examples, a carriage is driven by an actuator. In some examples, an actuator driving a carriage includes a servo motor and a toothed wheel interacting with a toothed track.

In the illustrated example, the lower portion 274 of frame 214 includes a first carriage assembly 278. The first carriage assembly 278 includes an upper linearly moveable carriage 280 and a lower linearly moveable carriage 282. The lower linearly moveable carriage 282 is mounted to a lower linear carriage track 284 on the base 268, and can be driven by lower carriage actuator 285. The upper linearly moveable carriage 280 is mounted to an upper linear carriage track 286 on the lower linearly moveable carriage 282, and can be driven by upper carriage actuator 287. In the illustrated example, the upper linear carriage track 286 is perpendicular to the lower linear carriage track 284. The pillar member 272 is rotatably mounted to the upper linearly moveable carriage 280. In this way, the elongated first arm 226 may be moved laterally by the lower linearly moveable carriage 282. Also, the upper linearly moveable carriage 284 may further extend the reach of the elongated first arm 226.

In some examples, the dismantling arm apparatus 202 includes a contamination containment system (not shown). In some examples, the contamination containment system is operable to perform a contamination containment operation when the elongated first arm 226 is in the extended position.

In some examples, the contamination containment system is operable to contain contamination adjacent the first cutter 244 when the elongated first arm 226 is in the extended position and the first cutter 244 is cutting a workpiece held by the first gripper 242. In some examples, the contamination containment system includes a vacuum system with an intake nozzle operable to draw debris adjacent the first cutter 244 when the elongated first arm 226 is in the extended position and the first cutter 244 is cutting a workpiece held by the first gripper 242. For example, the vacuum system may include a hose extending along elongated first arm 226 with a nozzle near the first gripper 242, the hose emptying into a collection apparatus secured to the base 268 or provided nearby. The vacuum system may also include a catch tray operable to be held beneath a cutting zone to catch radioactive contaminants falling out of a workpiece and/or environmental feature.

In some examples, the contamination containment operation occurs prior to the first cutter 244 cutting a workpiece held by the first gripper 242. In some examples, the contamination containment system includes a drill and a foam delivery system. For example, the contamination containment system may include a drill to pierce a workpiece such as a hollow pipe to provide an injection opening, and a foam nozzle operable to inject foam into the workpiece through the injection opening. In some examples, a drill may include a hollow drill bit that also functions as a foam injection nozzle to expel foam through the hollow core opening. In some examples, the foam is an expanding polyurethane foam.

In some examples, a drill and/or foam injection nozzle is integrated into the gripper jaw 252, such as into the moveable second jaw member 256. In some examples, a small quantity of foam is injected to fill a hollow workpiece such as a feeder tube with foam only in an arear around a cut zone. In some examples, injected foam forms a partial seal filling a hollow core of a workpiece to inhibit contaminants such as contaminated rust from falling out when the workpiece is cut.

Figure 4:
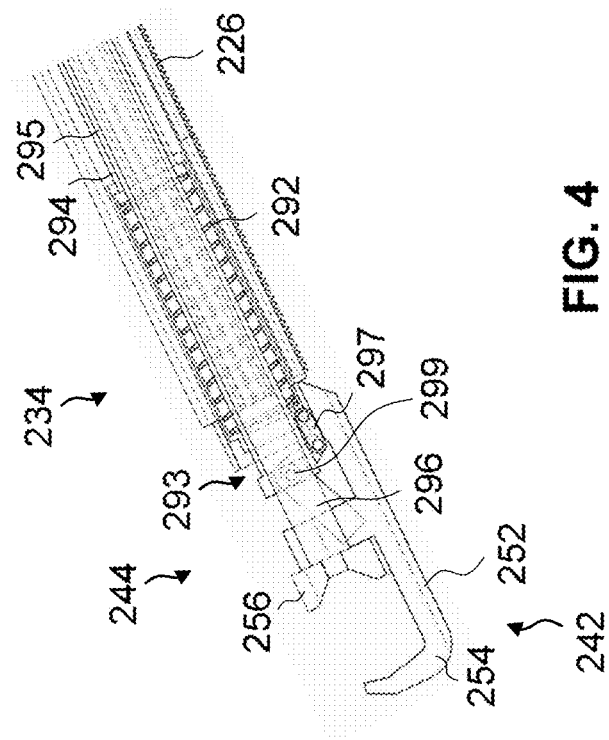
FIG. 4 is a cross sectional view of the first portion of the dismantling arm apparatus of FIG. 3.
Figure 5:
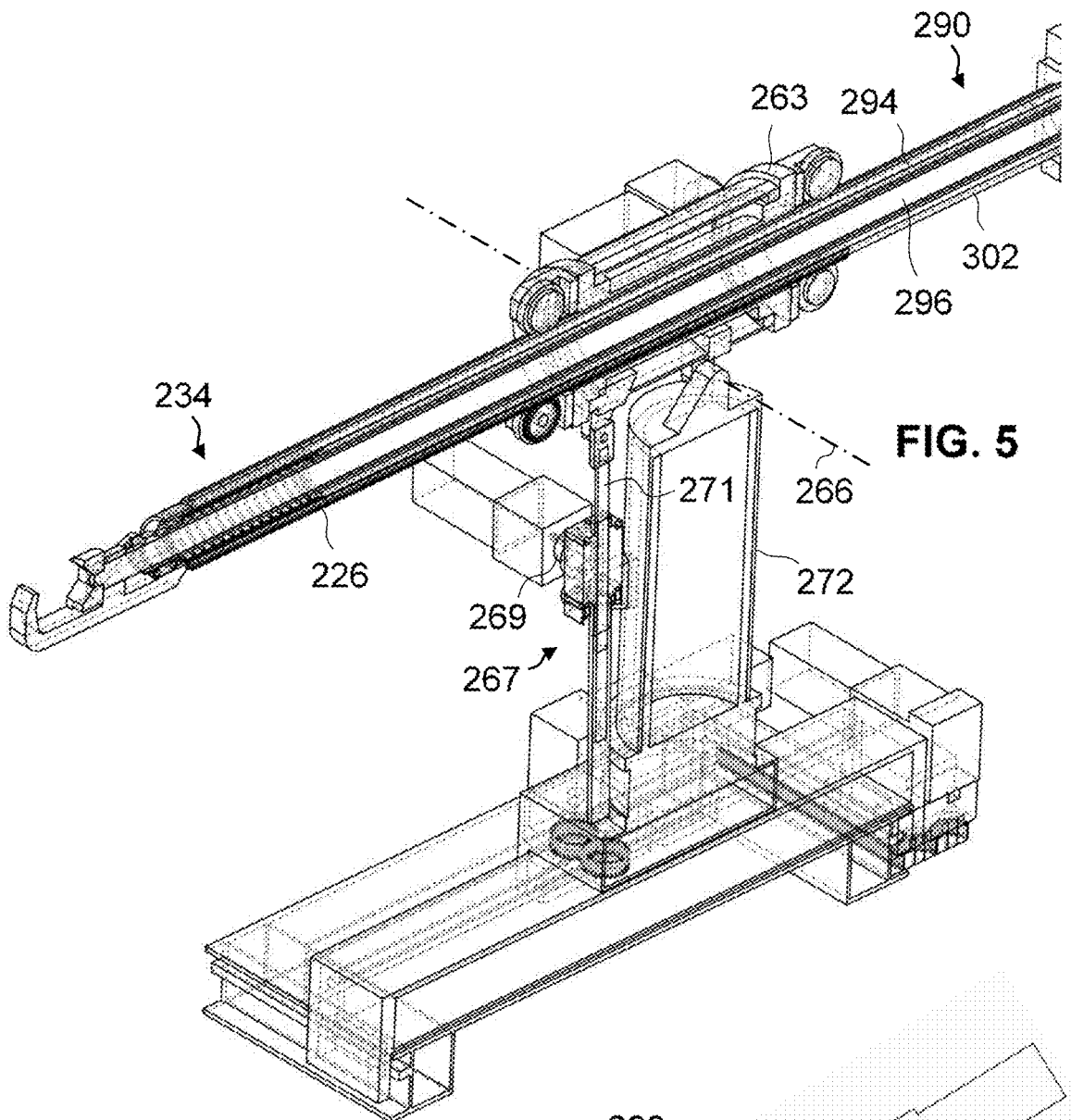
FIG. 5 is a cross sectional view of a second portion of the dismantling arm apparatus of FIG. 2.
Figure 6:
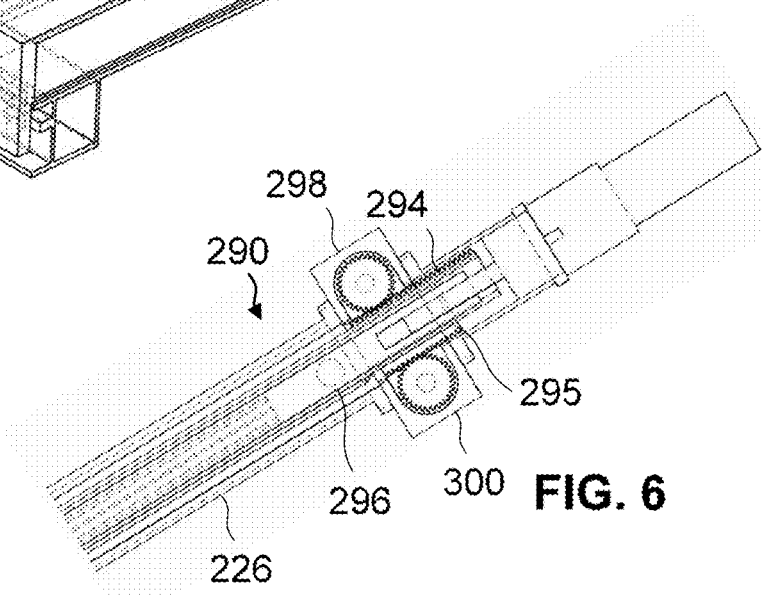
FIG. 6 is an expanded cross sectional view of a third portion of the dismantling arm apparatus of FIG. 2.

Referring now to FIGS. 4 to 6, in the illustrated example actuators at first arm rearward end 290 drive the first gripper 242 and the first cutter 244 at the first arm forward end 234.

In some examples, an operating window or operating opening is small. In some examples, an operating window or operating opening is too small to allow a cutter and a gripper to be mounted to an arm separately. In some examples, the cutter and the gripper are integrated. In some examples, the cutter and the gripper are integrated to allow operations in a small operating window. Referring to FIG. 4, in the illustrated example the jaw member 256 is advanced by advancing jaw shaft 296. In the illustrate example, the jaw shaft 296 is a screw with a dedicated motor at the back to drive it.

In the illustrated example, the first cutter 244 includes a saw blade. The saw blade is driven back and forth by a cutter shaft assembly 293. The cutter shaft assembly 293 includes an inner sleeve 295 and an outer sleeve 294. The inner and outer sleeves 295, 294 drive back and forth in a synchronized motion to drive the saw back and forth. To advance the saw through the workpiece, the outer sleeve 294 is gradually advanced relative to the inner sleeve 295 while they continue to oscillate together. The movement of the outer sleeve 294 relative to the inner sleeve 295 pushes on the sleeve link 297. The saw blade is pinned to the inner sleeve 295 at point 299, and since the sleeve link 297 is also pinned to the blade at a first end the movement of the second end of the link due to the outer sleeve 294 pushes the saw upward.

In the illustrated example, the cutter shaft assembly 293 also includes a coil array 292. The coil array 292 moves with eh outer sleeve 294. The sleeve link 297 is coupled to the outer sleeve 294 indirectly through the coil array 292. The coil array 292 is spring loaded to allow for compliance of the saw blade with the movement of the outer sleeve 294. The coil array also allows for pressure variance on the saw blade, since as the outer sleeve 294 is advanced it would apply higher force to the saw blade. By driving movement of the inner and outer sleeves 295, 294, the pressure may be profiled throughout the cut.

Referring to FIG. 6, the outer sleeve 294 is coupled at the first arm rearward end 290 to a first cutter actuator 298 to drive the outer sleeve 294 in reciprocal motion. The inner sleeve 295 is coupled at the first arm rearward end 290 to a second cutter actuator 300 to drive the inner sleeve 295 reciprocally. In the illustrated example, each of the first cutter actuator 298 and the second cutter actuator 300 include servo motors and toothed wheels interacting with toothed tracks on the outer and inner sleeves 294, 295, respectively.

Referring to FIG. 5, in the illustrated example each of the cutter shaft 294 and the jaw shaft 296 extends through an outer annular body 302 of the elongated arm member. In some examples, positioning the actuators opposite the end effectors allows the actuators to act as counterweights.

Referring again to FIG. 2, in some examples, the dismantling arm apparatus 202 has a single elongated arm or more than two elongated arms. Where the dismantling arm apparatus 202 has more than one elongated arm the elongated arms may be same or different. For example, one elongated arm may have more degrees of freedom than the others.

In the illustrated example, the dismantling arm apparatus 202 has two elongated arms 226, 228 so that first and second cutters 244, 246 may be applied to a workpiece at independent positions to cut the workpiece free from an environmental feature. For example, the workpiece may be a tubular workpiece, and the first cutter 244 can be applied to a first end of the tubular workpiece while the second cutter 246 is applied to the second end of the workpiece at the same time and/or without requiring the first cutter 244 to be moved to the second end of the workpiece.

In some examples, the dismantling arm apparatus 202 includes two or more dissimilar elongated arms. For example, the elongated second arm 228 may be less mobile and/or have less degrees of freedom than the elongated first arm 226. However, in the illustrated example the first and second elongated arms 226, 228 are similar and have the same degrees of freedom.

In the illustrated example, the first and second arms 226, 228 differ in the end effectors born by the arm. The first elongated arm 226 bears the first cutter 244 and the first gripper 242 as end effectors, while the second elongated arm 228 bears only the second gripper 246 as an end effector. In some examples, the first gripper 242 can apply a grip sufficient to hold a tubular workpiece cut free from an environmental feature by the first and second cutters 244, 246.

Figure 7:
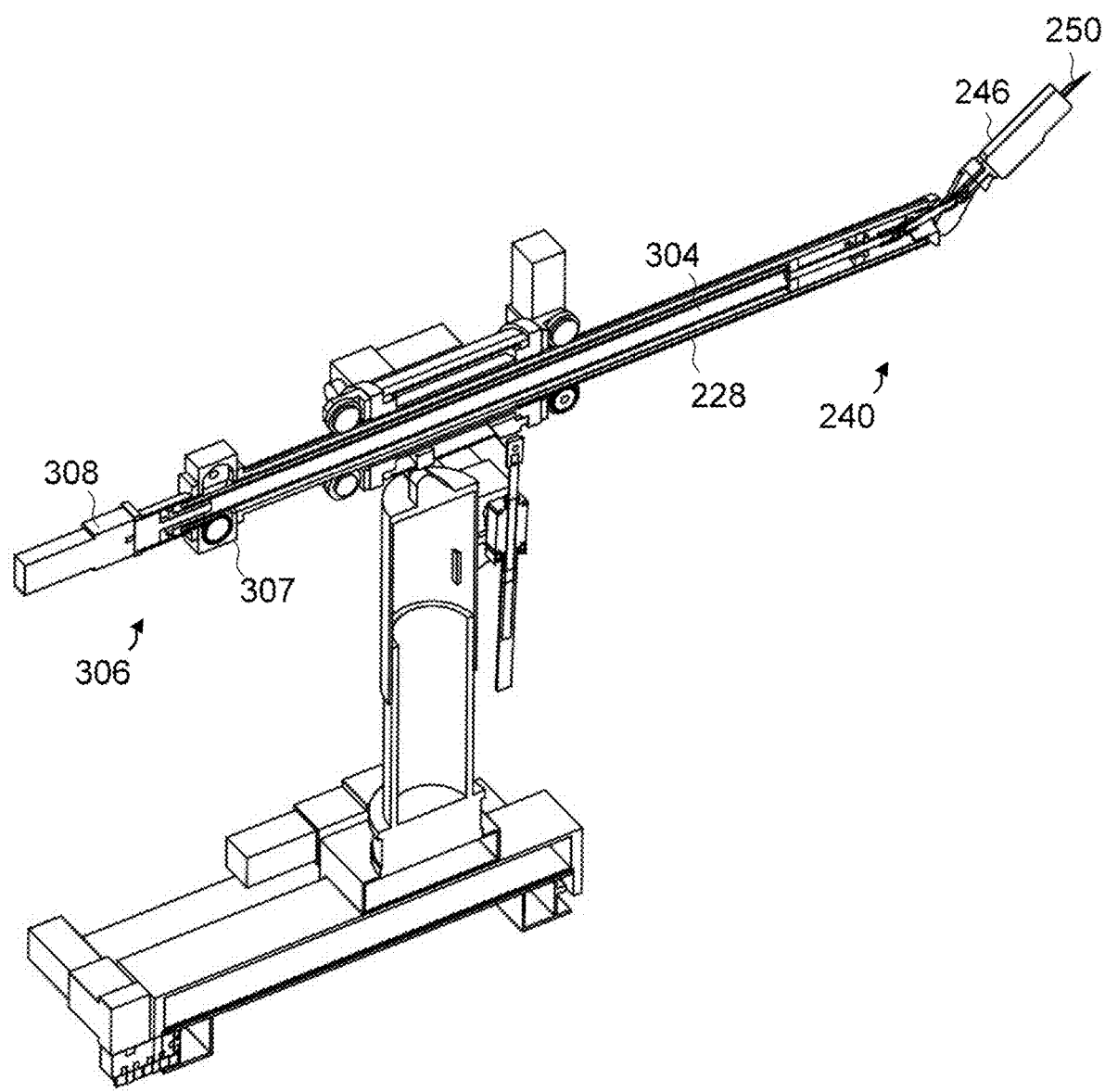
FIG. 7 is an expanded cross sectional view of a fourth portion of the dismantling arm apparatus of FIG. 2.

Referring to FIG. 7, elongated second arm 228 has second cutter 246 mounted and operable to cut adjacent second arm forward end 240 when elongated second arm 228 is in an extended position.

In the illustrated example, the second cutter 246 is coupled to a second cutter shaft 304 at the second arm forward end 240 to be positioned by the cutter shaft 304. The illustrated example second cutter 246 is an independent cutter with an integrated motor operable to drive the blade 250 reciprocally. The second cutter shaft 304 is coupled at the first arm rearward end 306 to a cutter actuator 307 to drive linkages at the arm forward end 240 to pivot the second cutter 246. In the illustrated example, the cutter actuator 307 includes a servo motor and a toothed wheel interacting with a toothed track on the cutter shaft 304. In some examples, the cutter actuator 307 is a pinion actuator. A rolling of the second cutter 246 can also be performed using the second cutter shaft 304 driven from an actuator 308 at the second arm rearward end 306. In some examples, a shaft and/or sleeve is a ram.

Referring again to FIG. 2, the dismantling arm apparatus 202 is a stationary apparatus to be positioned adjacent a workpiece. In some examples a stationary apparatus includes a skid to be rested directly on an environmental surface, and does not include tracks or wheels. In some examples, a stationary apparatus may be more stable and/or simpler than a mobile apparatus. The dismantling arm apparatus 202 is a stationary apparatus. In the illustrated example, the base 268 of the dismantling arm apparatus 202 is a skid to be carried to a resting position and rested directly on an environmental surface.

Referring now to FIGS. 8A to 8F, the dismantling arm apparatus 202 is shown in a hazardous environment. In FIGS. 8A to 8F, the hazardous environment is a chamber in a nuclear facility containing an environmental feature 310. The illustrated environmental feature 310 is a nuclear power plant fluid transport array. The illustrated nuclear power plant fluid transport array include a plurality of feeder tubes 312. Feeder tubes 312 are tubular members to carry fluid to a radioactive core. In some examples, the feeder tubes 312 and/or the chamber in which the feeder tubes 312 are found contains radioactive contamination.

In some examples, the dismantling arm apparatus 202 is used to interact with environmental features such as to cut the feeder tube 312 or a portion of the feeder tube 312 free from the environmental feature 310 after the feeder tube 312 has been used in a nuclear facility for a period of time. In some examples, a feeder tube in use in a nuclear facility begins to be repositioned due to lengthening of an environmental feature to which it is secured. In some examples, a feeder tube is secured to a pressure tube, and the pressure tube lengthens. In some examples, creep of the pressure tube causes the end fittings to which the feeders are connected to deform. In some examples, the lengthening of the pressure tubes has deformed the feeder tube 312. After a length of time, a final position of the feeder tube 312 may be different from an initial position of the feeder tube 312. In some examples, the resulting nuclear power plant fluid transport array is disordered and difficult to dismantle using automated dismantling apparatus.

In the illustrated example, the dismantling arm apparatus 202 is positioned adjacent a portion of the environmental feature 310. In some examples, one or more cameras or other sensors is placed on the dismantling arm apparatus 202 or near the dismantling arm apparatus 202 to provide location information to a remote user. In dismantling the nuclear power plant fluid transport array, the dismantling arm apparatus 202 may be operated to extend the elongated first arm 226 to a portion 314 of a feeder tube 312. The portion 314 of the feeder tube 312 is a workpiece 314 that is to be removed by the dismantling arm apparatus 202. In the illustrated example, the workpiece 314 is removed from the environmental feature 310 and deposited into a container 316.

Figure 8A:
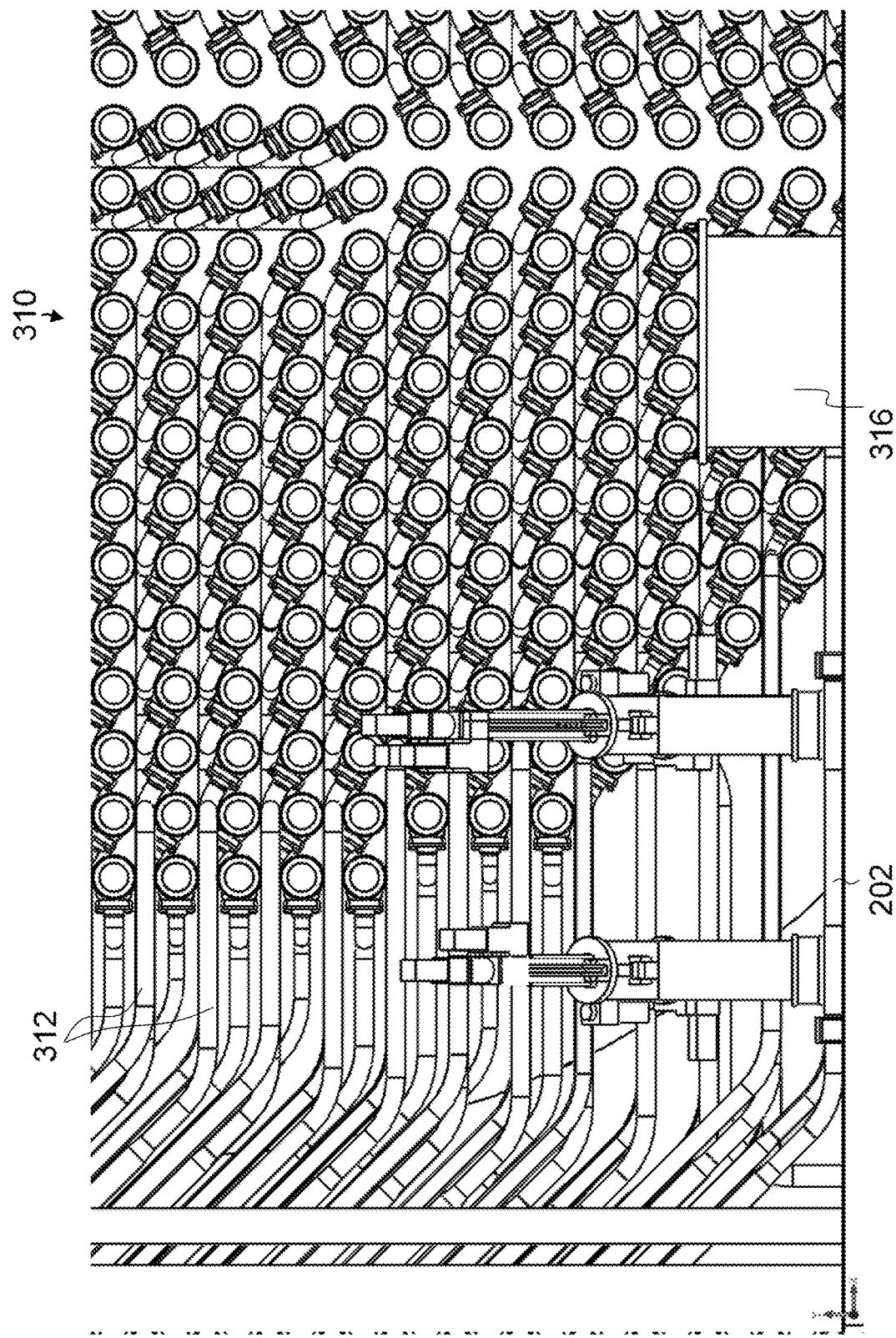
FIG. 8A is a perspective view of the dismantling arm apparatus of FIG. 2 in a first position in cutting a workpiece free from an environmental feature.
Figure 8B:
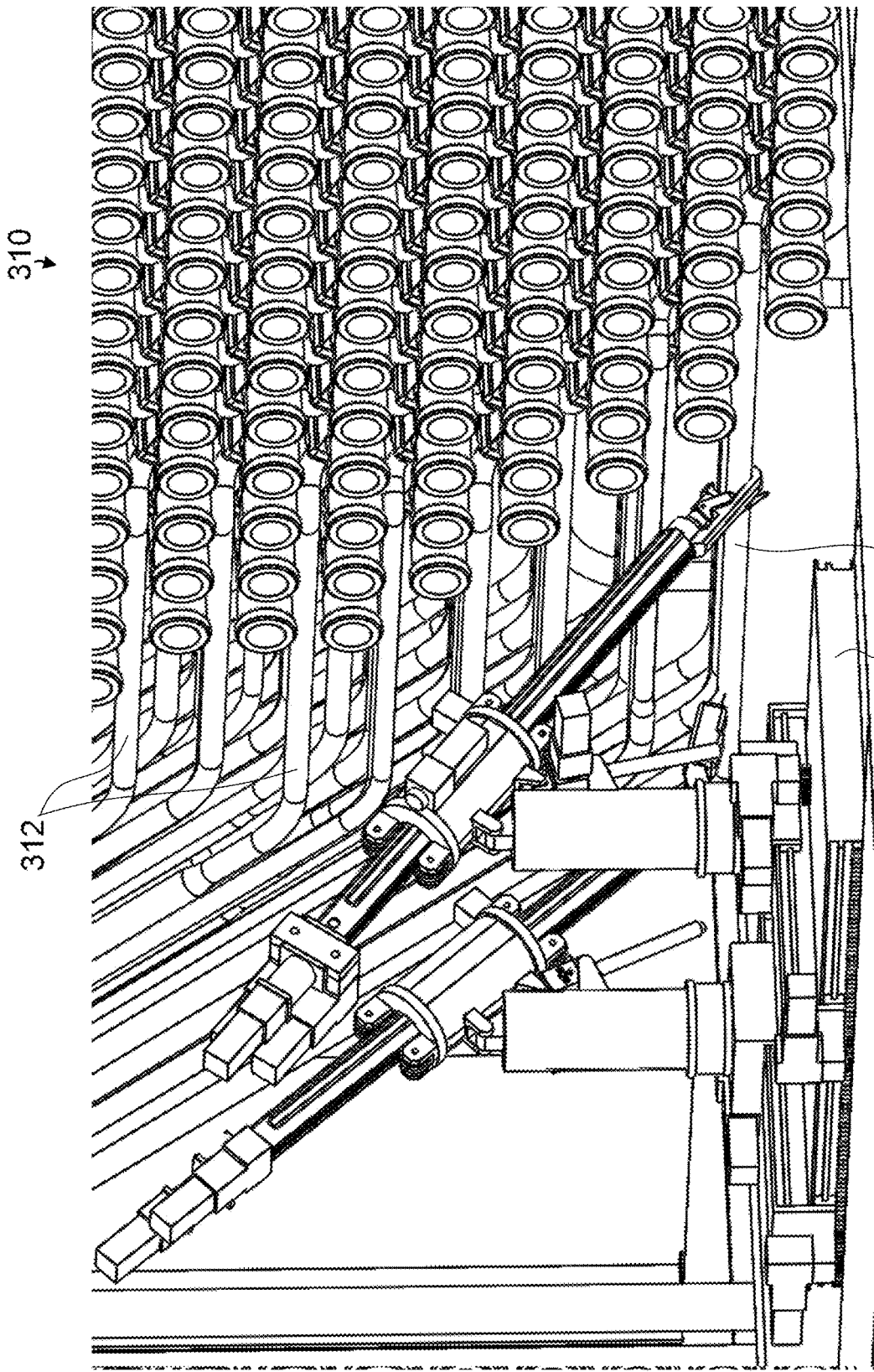
FIG. 8B is a perspective view of the dismantling arm apparatus of FIG. 2 in a second position in cutting the workpiece free from the environmental feature.

As illustrated in FIG. 8A, in some examples the dismantling arm apparatus 202 is positioned adjacent environmental feature 310. FIG. 8B shows the elongated first and second arms 226, 228 moved to extended positions adjacent a workpiece 314.

In some examples, maneuvering can be done using a joystick for course positioning and a haptic control system for fine positioning. In some examples, a user of a control system including a haptic feedback system maneuvers the elongated first and second arms 226, 228 into the extended positions, adjusting roll, pitch, and yaw as needed using a set of haptic feedback received from the dismantling arm apparatus 202. In some examples, the set of haptic feedback comes from actuator feedback and/or sensor information. For example, servo motor feedback and/or a torque sensor at a forward end of each of the elongated first and second arms 226, 228 may be used to provide a set of haptic feedback.

In the illustrated example shown in FIG. 8B, once the elongated first and second arms 226, 228 are in extended positions, the first gripper 242 is engaged to grip the workpiece 314, and the first and second cutters 244, 246 are engaged to cut the workpiece 314 free from the environmental feature 310. In the illustrated example, the first gripper 242 is mounted to the first arm 226 to grip the tubular workpiece 314 from a radial side of the tubular workpiece. The first cutter 244 is mounted to the first arm 226 to cut the tubular workpiece 314 free from the environmental feature 310 while the first gripper 242 holds the tubular workpiece 314 from the radial side of the tubular workpiece 314. In some cases only one of first and second cutters 244, 246 is needed to free the workpiece 314 from the environmental feature 310.

Figure 8C:
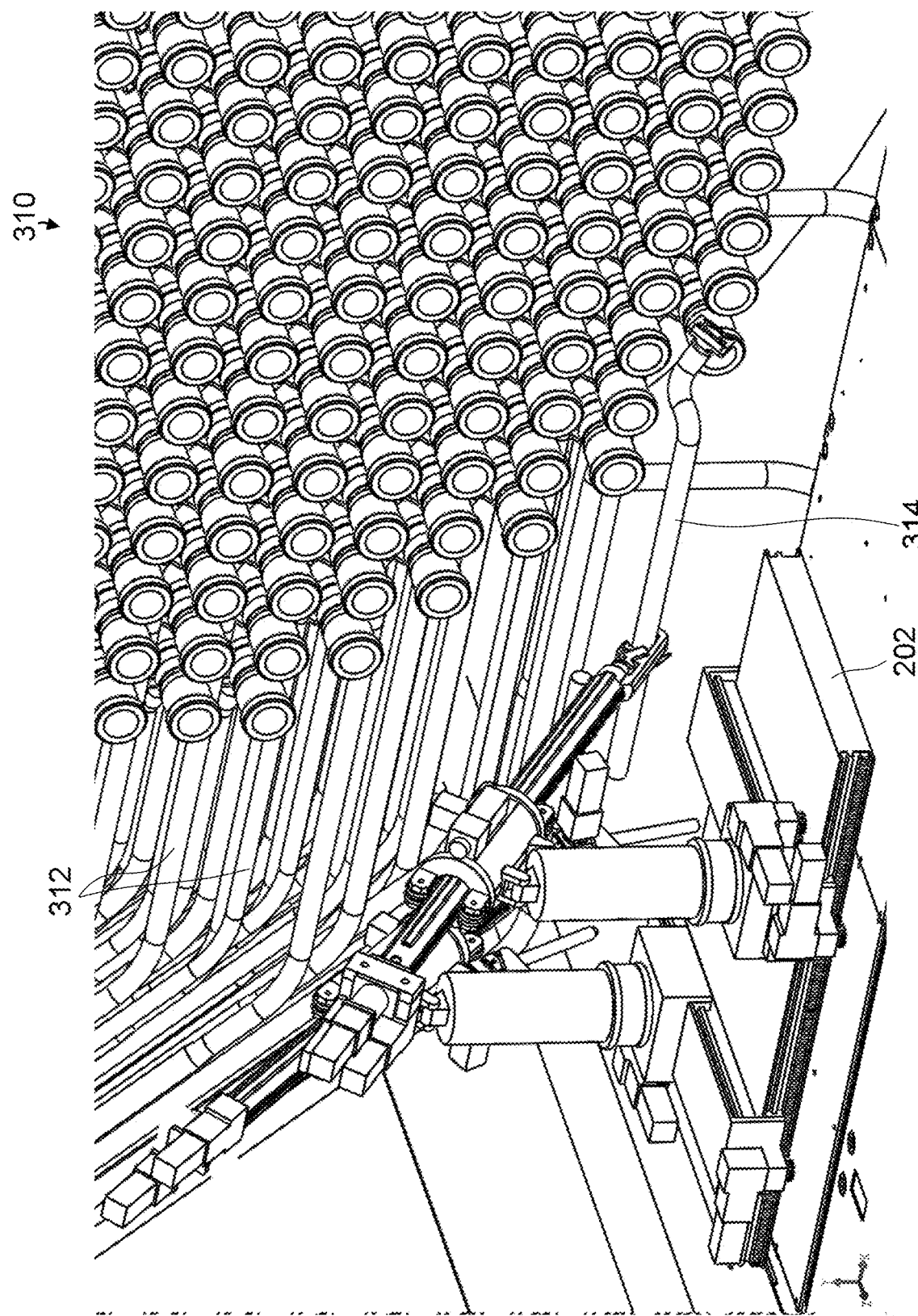
FIG. 8C is a perspective view of the dismantling arm apparatus of FIG. 2 in a third position in cutting the workpiece free from the environmental feature.
Figure 8D:
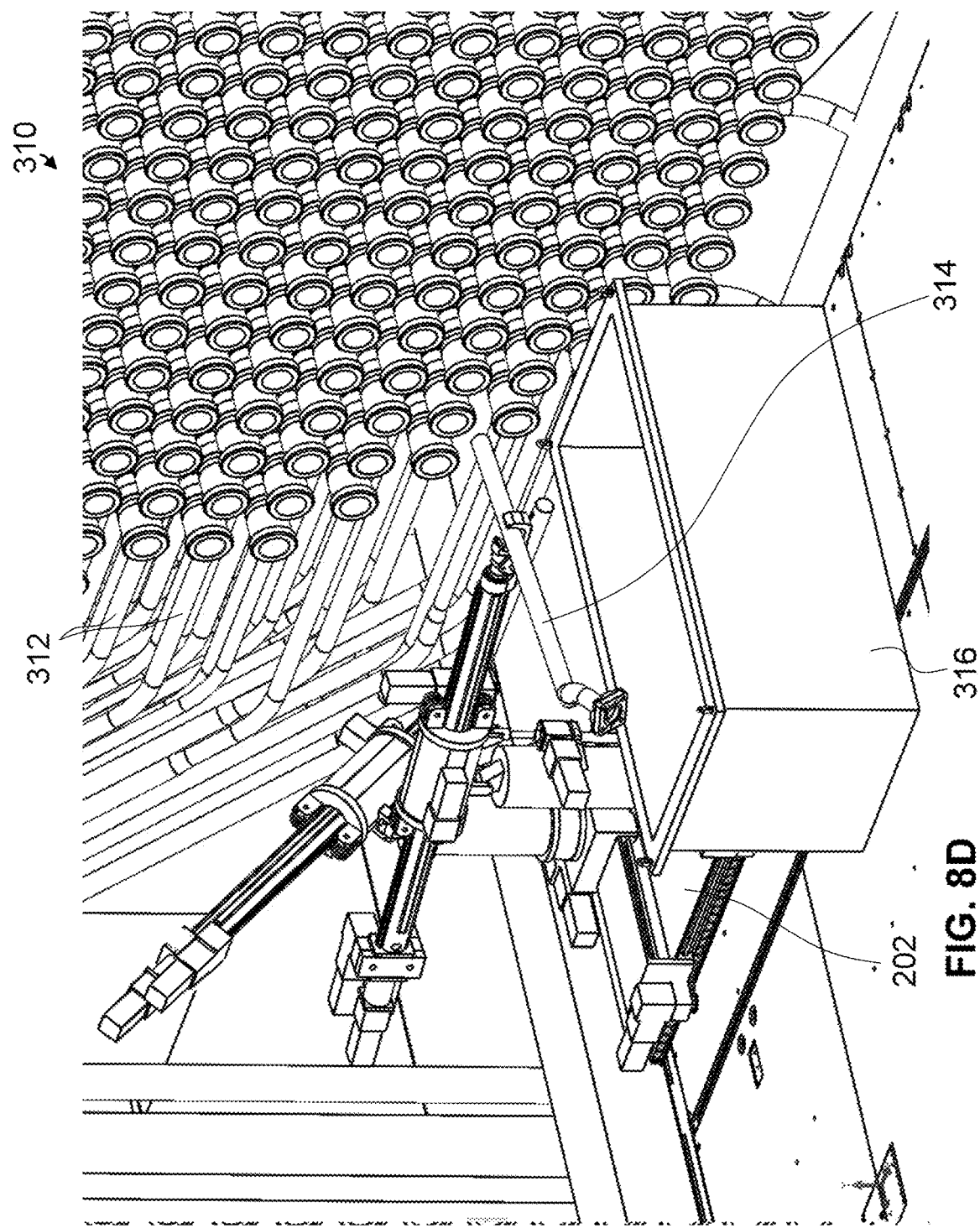
FIG. 8D is a perspective view of the dismantling arm apparatus of FIG. 2 in a fourth position in cutting the workpiece free from the environmental feature.

FIG. 8C shows the dismantling arm apparatus 202 being used to withdraw the freed workpiece 314. In some examples, a withdrawal stage of a dismantling operation is controlled using a haptic control system. FIG. 8D shows the dismantling arm apparatus 202 being used to transport the workpiece 314 to the container 316. In some examples, a transport stage of a dismantling operation is automated or semi automated. For example, where the position of the container 316 is known, the dismantling arm apparatus 202 can be told, once the workpiece 314 is in a ready position, to initiate an automated transport stage.

Figure 8E:
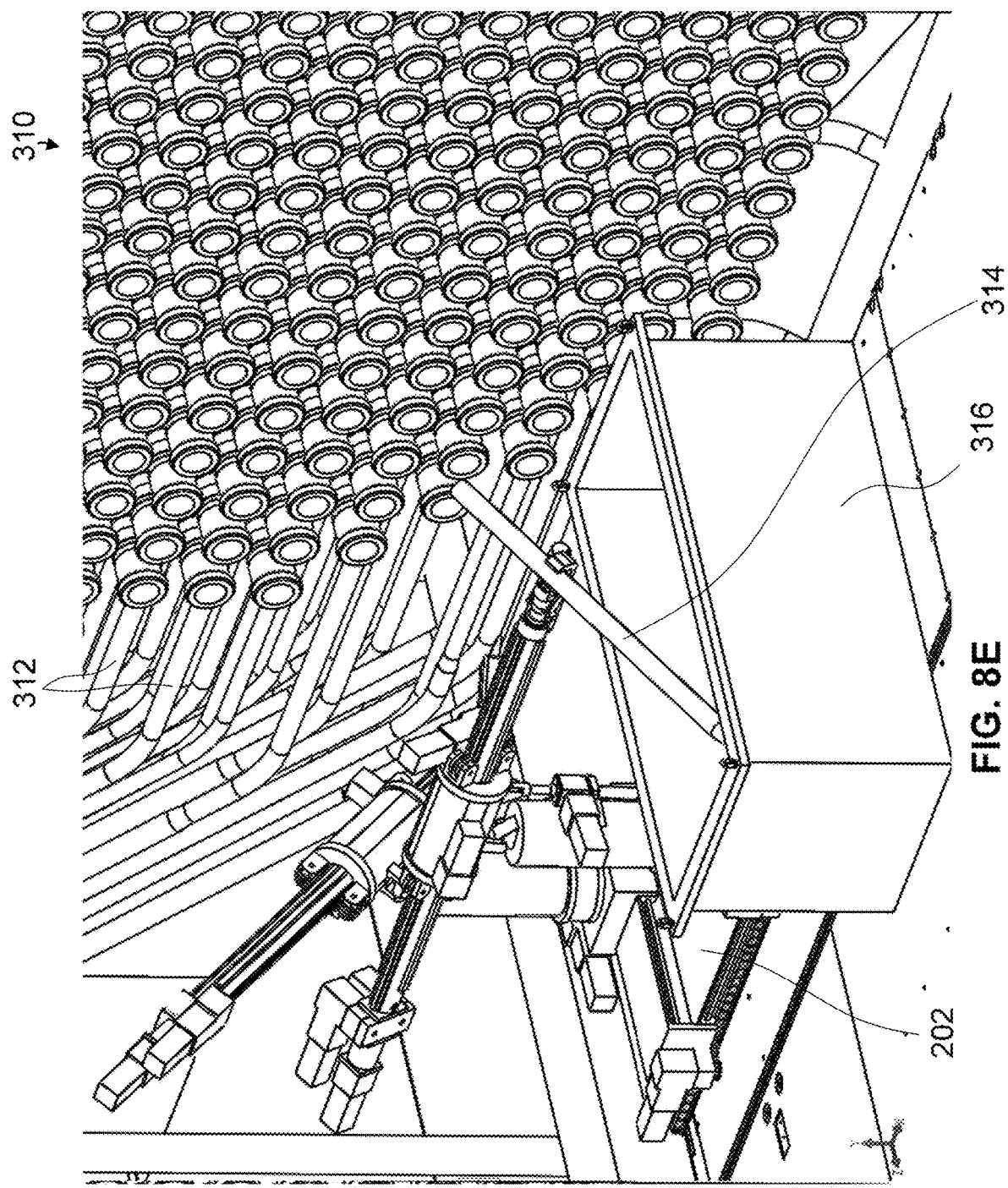
FIG. 8E is a perspective view of the dismantling arm apparatus of FIG. 2 in a fifth position in cutting the workpiece free from the environmental feature.
Figure 8F:
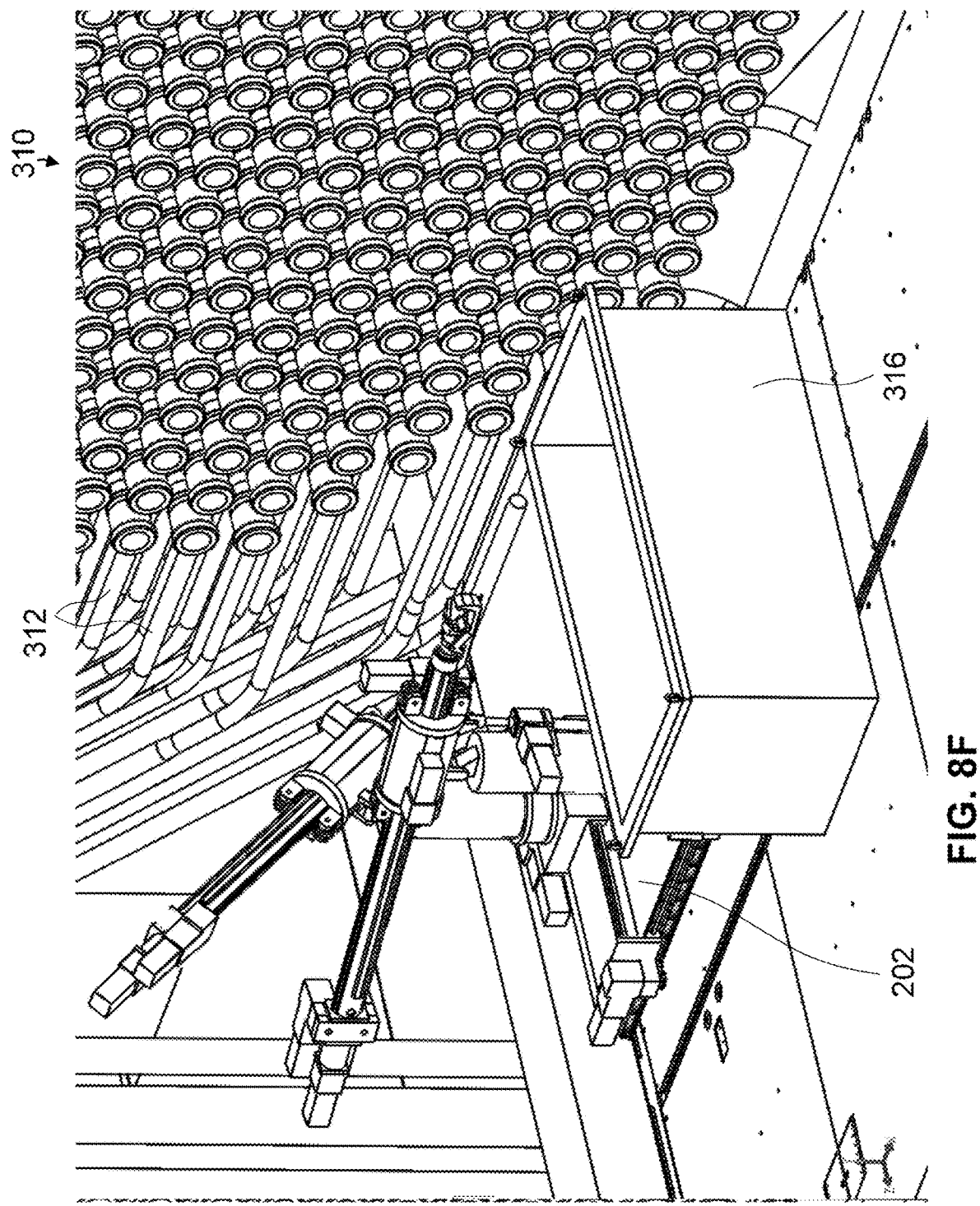
FIG. 8F is a perspective view of the dismantling arm apparatus of FIG. 2 in a sixth position in cutting the workpiece free from the environmental feature.

FIGS. 8E and 8F show the dismantling arm apparatus 202 depositing the workpiece 314 into the container 316. In some examples, a depositing stage of a dismantling operation is automated or semi automated. For example, the dismantling arm apparatus 202 can be told, once the transport stage is complete and/or as part of the transport stage, to initiate an automated depositing stage.

Figure 9A:
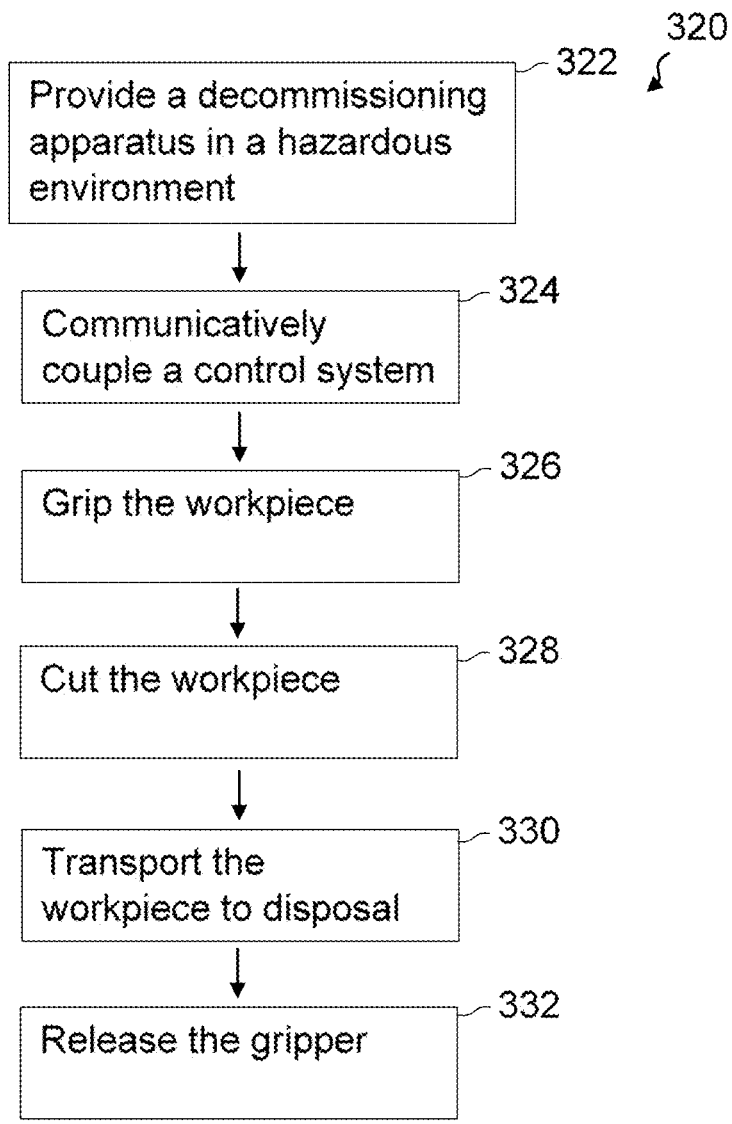
FIG. 9A is a schematic diagram of a dismantling method using a dismantling arm apparatus.

Referring now to FIG. 9A, illustrated is an example method 320 of dismantling in a hazardous environment using a dismantling arm apparatus. In some examples, the hazardous environment is a nuclear power facility or a chamber in a nuclear power facility. In the illustrated example, the method 320 includes a first step 322 of providing a dismantling apparatus (such as, for example, dismantling apparatus 102 or dismantling arm apparatus 202) in the hazardous environment. In some examples, the dismantling apparatus includes a first gripper and a first cutter.

In some examples, one or more preparation steps are performed before a method of dismantling. In some examples, a preparation step includes setting up scaffolding on which to place a dismantling apparatus so that the dismantling apparatus can reach a workpiece. In some examples, a preparation step includes removing a fitting from a workpiece to facilitate access to the workpiece by the dismantling apparatus. In some examples, a preparation step includes removing insulation from around a feeder tube workpiece. In some examples, a preparation step includes removing fasteners such as clamps or studs or screws from a feeder tube workpiece where the feeder tube workpiece is joined to an environmental feature by fasteners. In some examples, a preparation step includes removing one or more of a fastener, a closure plug, a hanger, and a sensor line.

The illustrated method 320 includes a second step 324 of communicatively coupling a haptic control system to the dismantling apparatus to control the dismantling apparatus and receive haptic feedback from the dismantling apparatus. In some examples, the haptic control system is remote from the dismantling apparatus, such as outside of the hazardous environment.

The method 320 also includes a third step 326 of operating the haptic control system while in a haptic feedback mode to move the first gripper to a workpiece and secure a first gripper hold on the workpiece. In some examples, a user can switch between a haptic feedback mode and a standard mode. For example, in a haptic feedback mode a user may be using a haptic control device which provides the set of haptic feedback to the user, while in the standard mode the user may be using a joystick or other non-haptic feedback control device which does not provide the set of haptic feedback to the user.

Figure 9B:
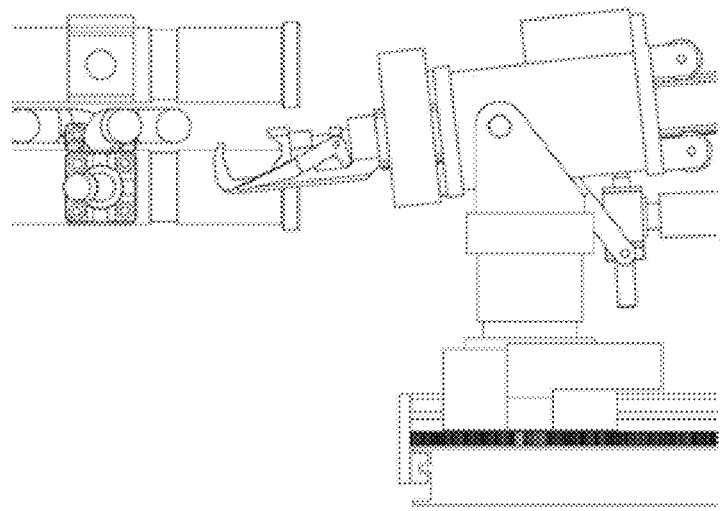
FIG. 9B is a cross sectional side view of a second dismantling arm apparatus in a first position.
Figure 9C:
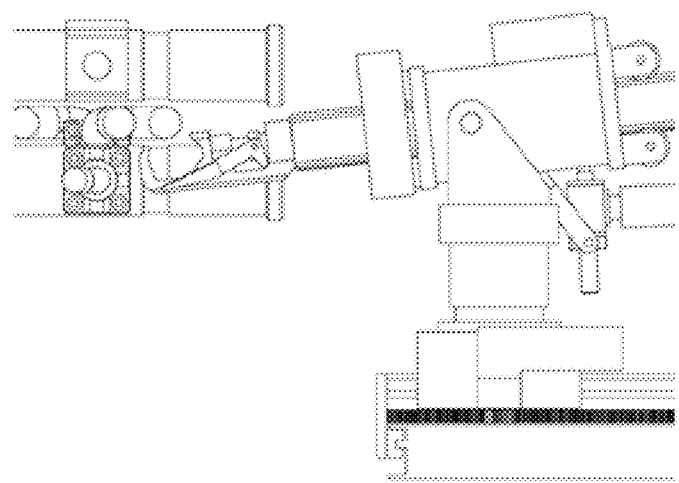
FIG. 9C is a cross sectional side view of the dismantling arm apparatus of FIG. 9B in a second position.
Figure 9D:
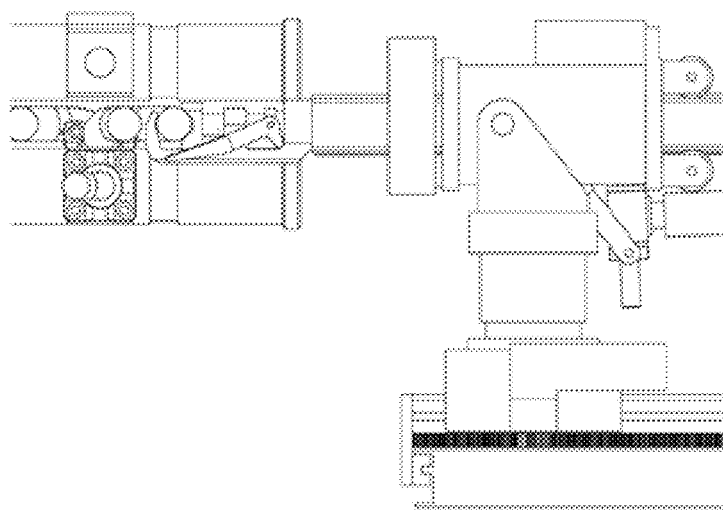
FIG. 9D is a cross sectional side view of the dismantling arm apparatus of FIG. 9B in a third position.

In some examples, moving the first gripper to a workpiece and securing a first gripper hold on the workpiece includes aligning a first arm longitudinal axis of an elongated first arm of the dismantling apparatus with an access opening in an environmental feature and advancing the elongated first arm into the access opening by extending the elongated first arm along the first arm longitudinal axis toward a workpiece at an internal end of the access opening (FIG. 9B). In some examples, moving the first gripper to a workpiece and securing a first gripper hold on the workpiece includes dipping a first arm forward end of the elongated first arm while advancing the elongated first arm to pass at least one jaw member of a set of jaws of a gripper under the workpiece (FIG. 9C), raising the first arm forward end to position the set of jaws around the workpiece, and closing the set of jaws on the workpiece (FIG. 9D).

In a fourth step 328, the method 320 includes operating the haptic control system, while maintaining the first gripper hold on the workpiece, to use the first cutter to cut the workpiece free from an environmental feature. In a fifth step 330, the method 320 includes operating the haptic control system, while maintaining the first gripper hold on the workpiece, to move the first gripper to a disposal location. In a sixth step 332, the method 320 includes operating the haptic control system to release the first gripper hold on the workpiece. Releasing the first gripper hold on the workpiece in some examples causes the workpiece to fall into a disposal container at the disposal location. In some examples, the disposal container is a low level waste container.

Figure 10A:
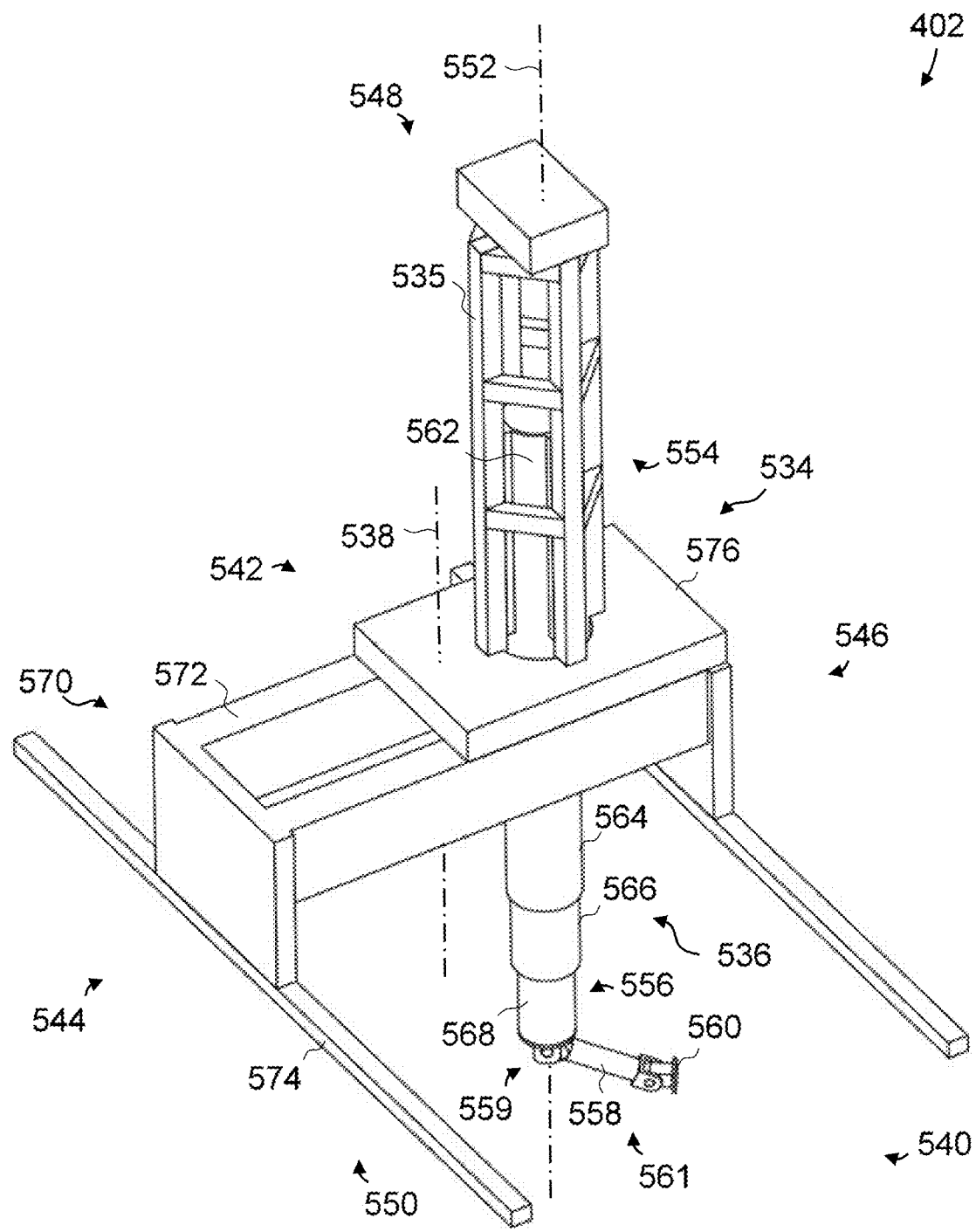
FIG. 10A is a perspective view of a dismantling mast apparatus.
Figure 10B:
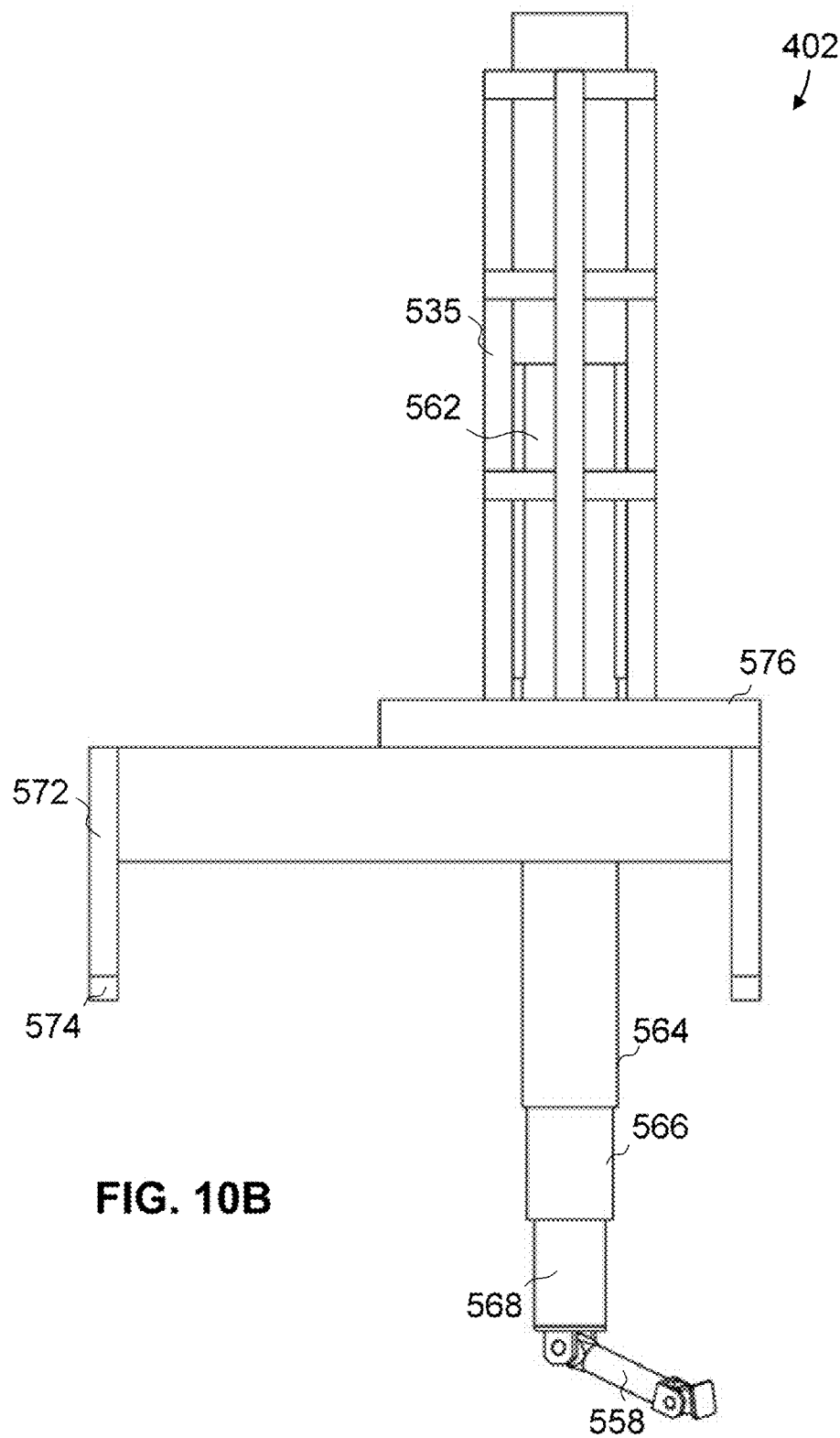
FIG. 10B is a side view of the dismantling mast apparatus of FIG. 10A.

Referring now to FIGS. 10A and 10B, illustrated is an example of a dismantling mast apparatus 402. The dismantling mast apparatus 402 is similar in many respects to the dismantling arm apparatus 202, and like features are identified by like reference numbers incremented by 200. In some examples, the dismantling mast apparatus 402 is a decommissioning apparatus. In some examples, the dismantling mast apparatus 402 is a decommissioning apparatus used in decommissioning a nuclear reactor.

In some examples, the dismantling mast apparatus 402 is for use in a dismantling operation in a nuclear facility. In some examples, the dismantling mast apparatus 402 is for use in dismantling a reactor core. In some examples, the dismantling mast apparatus 402 is to be secured to an environmental surface above a reactor core and/or a calandria to reach through an opening in a top wall of the reactor core and/or the calandria to interact with a workpiece in the reactor core and/or the calandria.

In some examples, an opening is obtained in a top wall of a reactor core chamber containing a calandria, and then the dismantling mast apparatus 402 is mounted outside the chamber adjacent the opening so that the mast member 536 is operable to extend into the chamber and interact with a workpiece of the calandria. In some examples, leaving a bottom half of a calandria in place allows a cut workpiece that falls to be caught in the bottom half without falling to a floor of a larger reactor core chamber.

The exemplary dismantling mast apparatus 402 includes a frame 534 and at least one mast member 536. The frame 534 has a frame vertical axis 538, a frame forward end 540, a frame rearward end 542, a frame first lateral side 544, a frame second lateral side 546, a frame top side 548, and a frame bottom side 550. The frame vertical axis 538 extends between the frame upper end 548 and the frame lower end 550. In the illustrated example, the frame 534 also includes an elongated mast support 535 to receive the mast member 536 therein and support the mast member 536.

In the illustrated examples, dismantling mast apparatus 402 includes a single mast member 536. A single mast member may fit more easily through an opening in a top wall of a chamber. In some examples, the opening in the top wall of the chamber is kept small to control radioactivity outside the chamber and/or to control the movement of radioactive contaminants.

Mast member 536 is mounted to the frame 534 and has a mast vertical axis 552 extending between a mast upper end 554 and a mast lower end 556 opposite the mast upper end 554. In the illustrated example, the mast vertical axis 552 is parallel to the frame vertical axis 538. In some examples, the mast vertical axis 552 parallel to the frame vertical axis 538 may reduce side pressure on the mast member 536.

In some examples, a work arm 558 is mounted to the mast member 536. The illustrated work arm 558 has a work arm proximate end 559 pivotally mounted to the mast lower end 556 and a work arm distal end 561 opposite the work arm proximate end 559. The illustrated work arm 558 bears an end effector 560 and/or end effector coupling (not shown) at the work arm distal end 561.

In some examples, the end effector 560 is a gripper. In in some examples, the end effector 560 is interchangeably. In some examples, the work arm 558 includes an end effector coupling for interchangeably joining one or more of a variety of end effectors such as one or more of a gripper, a cutter, and a contamination containment system. In some examples, the dismantling mast apparatus 402 includes an end effector rack to hold multiple interchangeable end effectors.

In some examples, the mast member 536 is moveable between a retracted position to facilitate dispensing the workpiece and an extended position having the mast lower end 556 extending an extended distance below the frame bottom side 550 to reach the workpiece. In some examples, when the mast member 536 is in the extended position and the end effector 560 is a gripper, the gripper is operable to grab a workpiece adjacent the mast lower end 556.

In the illustrated example, the mast member 536 is a telescoping mast member including a barrel 562 and at least one stage. In the illustrated example, the mast member 536 includes the barrel 562, a first intermediate stage 564, a second intermediate stage 566, and a bottom stage 568. In the illustrated example, the work arm 558 is pivotally secured to the bottom stage 568 at a mast lower end 556.

In some examples, at least one of work arm roll, work arm pitch, work arm yaw, work arm longitudinal position, work arm vertical position, and work arm lateral position of the work arm 558 can be adjusted. One or more movements may be driving by one or more actuators. In some examples, the mast member 536 can rotate about the mast vertical axis 552. In some examples, the work arm 558 can pivot relative to mast member 536. In some examples, the mast member 536 can be lowered to adjust the vertical position of the work arm 536.

In the illustrated example, the position of the work arm 536 can also be adjusted by adjusting the frame 534. In some examples, the mast member 536 is mounted on a carriage assembly including at least one moveable carriage. In some examples the moveable carriage is a linearly moveable carriage moveable along a linear carriage track.

In the illustrated example, the frame 534 includes a carriage assembly 570. The carriage assembly 570 includes a lower carriage 572 movable along a linear track (not shown) on a base 574 of the frame 534, and an upper carriage 576 movable along a linear track (not shown) on the lower carriage 572. The mast member 536 is mounted to the upper carriage 576. In the illustrated example, the elongated mast support 535 is secured to the upper carriage 576 and the mast member 536 is received in the elongated mast support 535.

Figure 11:
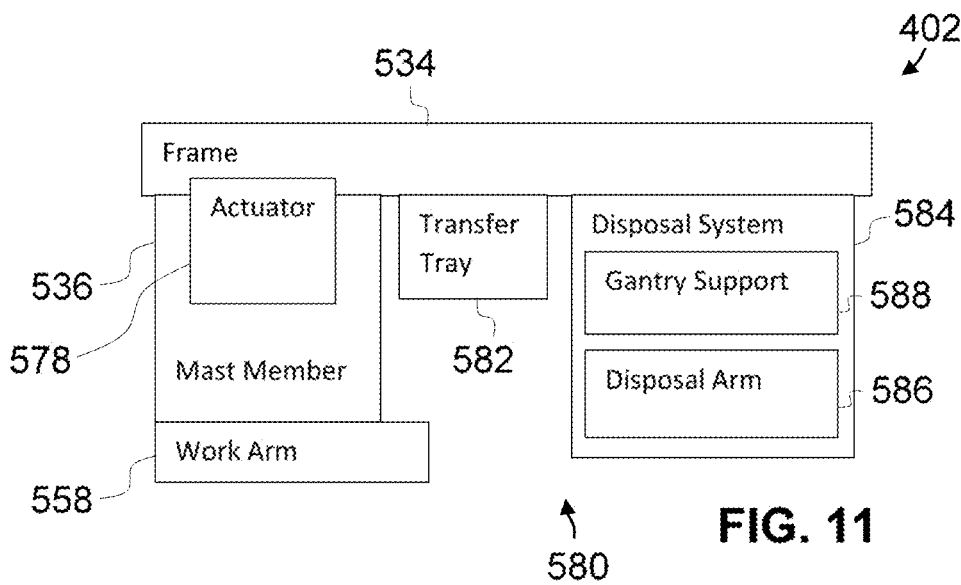
FIG. 11 is a schematic diagram of the dismantling mast apparatus of FIG. 10A.

In some examples, one or more sensors can provide a set of haptic feedback to a control system. In some examples, a set of haptic feedback includes sensor information from one or more sensors and information from one or more actuators. In some examples, a set of haptic feedback includes information from a torque sensor, information from at least one carriage actuator, and information from at least one additional actuator. In some examples, a set of haptic feedback includes information from a torque sensor mounted to the work arm 536, information from an actuator driving the upper carriage 576, information from the lower carriage 572, and information from a winch actuator 578 (FIG. 11).

In some examples, the dismantling mast apparatus 402 is a stationary apparatus to be positioned adjacent a workpiece. In some examples, a stationary apparatus includes a skid to be rested directly on an environmental surface, and does not include tracks or wheels. In some examples, a stationary apparatus may be more stable and/or simpler than a mobile apparatus. The illustrated dismantling mast apparatus 402 is a stationary apparatus. In the illustrated example, the base 574 of the dismantling mast apparatus 402 is a skid to be carried to a resting position and rested directly on an environmental surface and/or secured to the environmental surface.

In some examples, the dismantling mast apparatus 402 is secured above a chamber in a nuclear facility to extend the mast member 536 through an opening in a chamber wall to manipulate a workpiece in the chamber. For example, the base 574 of the dismantling mast apparatus 402 may be bolted to an environmental surface adjacent an opening in a cover of a chamber in a nuclear facility, with the mast member operable to extend down through the opening into the chamber.

In some examples, the dismantling mast apparatus 402 is secured above a reactor core of a nuclear facility to cut free and/or remove a workpiece in the reactor core. In some examples, the end effector 560 is a cutter, such as a thermal cutter or a mechanical cutter. In some examples, a mechanical cutter includes a diamond wire saw or a reciprocating blade saw. In some examples, a thermal cutter includes a torch or a laser.

In some examples, the end effector 560 is a gripper such as a mechanical gripper or a magnetic gripper. In some examples, a mechanical gripper includes a jaw or a penetrating screw. In some examples, the end effector 560 is both a gripper and a cutter so that a workpiece may be grasped, cut free, and then retracted.

In some examples, the mast member 536 of the dismantling mast apparatus 402 is to be operated in highly contaminated air and/or underwater. For example, a reactor core may be submerged during operations. In some examples, one or more joints in the dismantling mast apparatus 402 and/or mast member 536 and/or work arm 558 may be sealed against the intrusion of contaminants and/or fluid. For example, the introduction of radioactive contaminants between stages of the telescoping mast member 536 may render the mast member 536 unsuitable for use in other facilities and/or requiring extensive decontamination. In some examples, one or more stage of the telescoping mast member 536 is booted or covered.

In some examples, the dismantling mast apparatus 402 is an economically constructed apparatus. In some examples, the dismantling mast apparatus 402 is a rugged construction for harsh environments.

Referring now to FIG. 11, dismantling mast apparatus 402 is shown in schematic form. The illustrated example dismantling mast apparatus 402 includes a frame 534 and a mast member 536 coupled to the frame. It also includes an actuator 578 joined to the mast member 536 to move the mast member 536 between a retracted position having the mast lower end 556 a retracted distance from the frame bottom side 550 and an extended position having the mast lower end 556 extending an extended distance below the frame bottom side 550, the extended position below the retracted position.

In some examples, the actuator 578 is a simple, durable actuator. In some examples, the actuator 578 is a hydraulic actuator, jackscrew, or numeric actuator. In some examples, the actuator 578 is a winch or hoist actuator. In some examples, a winch or hoist actuator is more durable, simpler, stronger, or cheaper than a hydraulic actuator, jackscrew, or numeric actuator. In some examples, the winch actuator 578 is secured to the frame 534 and to the bottom stage 568 of the mast member 536 to raise and lower the bottom stage 568 relative to the frame 534.

In some examples, the dismantling mast apparatus 402 also includes a transfer system 580. In some examples, a transfer system accepts a workpiece withdrawn from a chamber of a nuclear facility by the mast member 536 so that the mast member 536 may be freed to retrieve a further workpiece from the chamber.

In the illustrated example, the transfer system 580 includes a transfer tray 582 mounted to the frame 534 adjacent the mast lower end 556 when the mast lower end 556 is in the retracted position. The transfer tray 582 is to receive a workpiece from the work arm 558, and the work arm in some examples is operable to carry the workpiece above the transfer tray when the mast member 536 is in the retracted position.

The illustrated example transfer system 580 also includes a disposal system 584. In some examples, the disposal system 584 includes a gantry support 588 to hold a disposal arm 586 operable to retrieve a workpiece from the transfer tray 582 and carry the workpiece from the transfer tray 582 to a disposal location such as a container off of the dismantling mast apparatus 402. The transfer system 580 may also have one or more degrees of freedom. For examples, the gantry support 588 may ride a carriage moveable along a linear track.

In some examples, one or more cameras or other sensors may be placed within a chamber within which the work arm 536 is to cut a workpiece. In some examples, one or more cameras or other sensors may be placed adjacent the transfer system 580. In some examples, one or more cameras or other sensors provides information to a control system for use by an operator in moving the dismantling mast apparatus 402. In some examples, one or more component of a dismantling apparatus or related equipment is radiation hardened. In some examples, one or more camera is radiation hardened. In some examples, one or more component of a dismantling apparatus or related equipment is radiation shielded. In some examples, radiation shielding is more economical than radiation hardening. In some examples, no radiation hardening and no radiation shielding is used.

Figure 12:
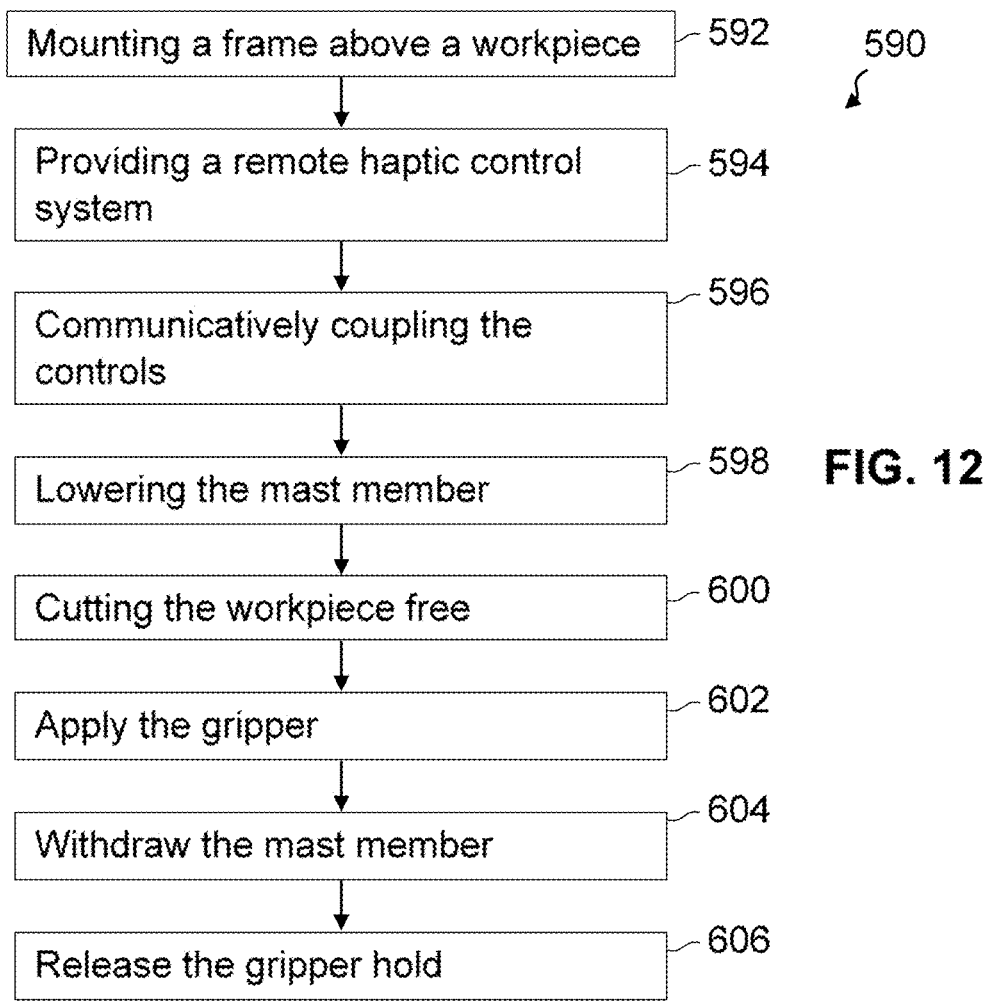
FIG. 12 is a schematic diagram of a dismantling method using a dismantling mast apparatus.

Referring now to FIG. 12, illustrated is an example of a method 590 of dismantling in a hazardous environment. In a first step 592, method 590 includes mounting a frame of a dismantling apparatus, such as dismantling mast apparatus 402, to an environmental surface in the hazardous environment above a workpiece, the dismantling apparatus including mast member mounted to the frame and extendable below the frame. In some examples, the hazardous environment is in a nuclear power facility.

In a second step 594, method 590 includes providing a haptic control system at a remote location remote from the hazardous environment. In a third step 596, method 590 includes communicatively coupling the haptic control system in the remote location to the dismantling apparatus in the hazardous environment to control the dismantling apparatus and receive haptic feedback from the dismantling apparatus;

In a fourth step 598, method 590 includes operating the haptic control system in the remote location in a haptic feedback mode to lower the mast member below the frame and position a cutter secured to a lower end of the mast member adjacent the workpiece. In some examples, a user can switch between a haptic feedback mode and a standard mode. For example, in a haptic feedback mode a user may be using a haptic control device which provides the set of haptic feedback to the user, while in the standard mode the user may be using a joystick or other non-haptic feedback control device which does not provide the set of haptic feedback to the user.

In a fifth step 600, method 590 includes operating the haptic control system in the remote location while the cutter is adjacent the workpiece to apply the cutter to the workpiece to cut the workpiece free from an environmental feature.

Optionally, in a sixth step 602, method 509 includes operating the haptic control system in the remote location to apply a gripper secured to the lower end of the mast member to the workpiece to secure a gripper hold on the workpiece. In some examples, a gripper is mounted to a mast member and/or work arm adjacent a cutter, and both the gripper and the cutter can be applied to a workpiece at the same time. In some examples, a mast member and/or work arm must change a cutter end effector to a gripper end effector to secure a gripper hold on the workpiece.

Optionally, in a seventh step 604, method 509 includes operating the haptic control system in the remote location, after the workpiece is cut free from the environmental feature and while maintaining the gripper hold, to withdraw the mast member to a retracted position wherein the gripper is above a tray. Optionally, in an eighth step 606, method 509 includes operating the haptic control system in the remote location to release the gripper hold when the gripper is above the tray to deposit the workpiece into the tray.

In some examples, a transfer system and/or disposal system is operable to retrieve a workpiece from the tray and move the workpiece to a disposal location, such as a disposal bin.

The present invention has been described here by way of example only. Various modification and variations may be made to these exemplary embodiments without departing from the scope of the invention, which is limited only by the appended claims.

The invention claimed is:

1. A nuclear dismantling system for dismantling equipment contaminated with radioactive contamination, comprising:
   a dismantling apparatus to be operated remotely while in a nuclear facility, including:
      a frame having a frame vertical axis,
      a mast member mounted to the frame, the mast member extending along a mast vertical axis and having a mast lower end to enter an underlying chamber; and
      a work arm mounted to the mast member and bearing a gripper, and wherein the mast member is moveable between a retracted position to facilitate dispensing the workpiece and an extended position having the mast lower end extending an extended distance below a frame bottom side to reach the workpiece, and
      wherein when the mast member is in the extended position the gripper is operable to grab a workpiece adjacent the mast lower end, and
   a control system communicatively coupled to the dismantling apparatus to control the dismantling apparatus remotely.

2. The dismantling system of claim 1, wherein the control system is a haptic control system and is communicatively coupled to the dismantling apparatus to receive a set of haptic feedback from the dismantling apparatus.

3. The dismantling system of claim 1, wherein the mast member is mounted to the frame with the mast vertical axis parallel with the frame vertical axis.

4. The dismantling system of claim 1, further comprising a winch actuator to move the mast member between the retracted position and the extended position.

5. The dismantling system of claim 4, wherein the mast member is a telescoping mast member including a barrel and at least one stage.

6. The dismantling system of claim 5, wherein the at least one stage includes a bottom stage, the barrel is at a mast upper end and the bottom stage is at the mast lower end, and the winch actuator is secured to the frame and to the bottom stage to raise and lower the bottom stage relative to the frame.

7. The dismantling system of claim 1, wherein the work arm is pivotally mounted to the mast lower end.

8. The dismantling system of claim 1, wherein the frame includes a base and at least one linearly moveable carriage, each linearly moveable carriage moveable relative to the base along a linear carriage track, the mast member mounted to the at least one linearly movable carriage.

9. The dismantling system of claim 8, wherein the at least one linearly moveable carriage includes a first carriage movable along a first linear track on the base; and a second carriage movable along a second linear track on the first carriage, the second linear track perpendicular to the first linear track and the mast member mounted to the second carriage.

10. The dismantling system of claim 9, wherein the dismantling apparatus is a stationary apparatus to be positioned adjacent a workpiece.

11. The dismantling system of claim 1, wherein the dismantling apparatus further comprises:
   a transfer tray mounted to the frame adjacent the mast lower end when the mast lower end is in the retracted position to receive a workpiece from the work arm; and
   a disposal system mounted to the frame adjacent the transfer tray, the disposal system including a movable disposal arm to retrieve the workpiece from the transfer tray and carry the workpiece to a disposal location.

12. The dismantling system of claim 11, wherein the disposal system includes a gantry support, the disposal arm mounted to the gantry support.

* * * * *